US008341043B2

(12) United States Patent
Tingle et al.

(10) Patent No.: US 8,341,043 B2
(45) Date of Patent: Dec. 25, 2012

(54) DYNAMIC PREPAYMENT RISK MANAGEMENT

(75) Inventors: Justin Tingle, Narrabeen (AU); Donald Neil Williams, Oyster Bay (AU); Geoffrey Peter Tunbridge, Baulkham Hills (AU)

(73) Assignee: Westpac Bank Corporation, Sydney, New South Wales (AU)

( * ) Notice: Subject to any disclaimer, the term of this patent is extended or adjusted under 35 U.S.C. 154(b) by 286 days.

(21) Appl. No.: 12/761,995

(22) Filed: Apr. 16, 2010

(65) Prior Publication Data

US 2010/0268626 A1    Oct. 21, 2010

(30) Foreign Application Priority Data

Apr. 16, 2009   (AU) ................................ 2009901629
Sep. 25, 2009   (AU) ................................ 2009220033

(51) Int. Cl.
*G07B 17/00*    (2006.01)
*G07F 19/00*    (2006.01)
*G06Q 40/00*    (2012.01)

(52) U.S. Cl. .......................................... 705/30; 705/35
(58) Field of Classification Search ................ 705/30, 705/35
See application file for complete search history.

(56) References Cited

U.S. PATENT DOCUMENTS

| 6,135,349 A | 10/2000 | Zirkel |
| 6,752,313 B1 | 6/2004 | Caviles et al. |
| 2002/0016778 A1* | 2/2002 | Konno et al. .................... 705/80 |
| 2002/0038277 A1* | 3/2002 | Yuan ................................ 705/37 |
| 2003/0105696 A1 | 6/2003 | Kalotay et al. |
| 2004/0133486 A1* | 7/2004 | Markki et al. .................. 705/34 |
| 2007/0168277 A1 | 7/2007 | Marchesi |
| 2007/0265986 A1 | 11/2007 | Sgaraglio et al. |
| 2007/0294156 A1 | 12/2007 | Hughes et al. |
| 2008/0097897 A1 | 4/2008 | Sadowski et al. |
| 2008/0262961 A1* | 10/2008 | Dellomo et al. ................ 705/38 |
| 2009/0177552 A1* | 7/2009 | Caven et al. .................... 705/21 |

FOREIGN PATENT DOCUMENTS

| JP | 2003-141356 | 5/2003 |
| JP | 2008-171239 | 7/2008 |
| JP | 28171239 A2 | 7/2008 |
| KR | 7039015 A | 4/2007 |
| WO | WO99/46710 | 9/1999 |
| WO | WO01/61532 | 8/2001 |

OTHER PUBLICATIONS

Taking fear out of risk. Anonymous. International Securities Finance. pp. 30-32. Jun. 1, 2004.*

* cited by examiner

*Primary Examiner* — Scott Zare
(74) *Attorney, Agent, or Firm* — Hunton & Williams LLP

(57) ABSTRACT

A system and method are disclosed for monitoring, managing and reporting credit card prepayment risk for an issuing bank. Sales data, corresponding payment data and data indicating the fulfillment of orders are monitored. The amount required as security by the bank is dynamically adjusted, for example on a daily basis, in response to the quantum of prepayment exposure determined by the data.

13 Claims, 19 Drawing Sheets

Figure 11

Prepayment Risk - Sales

Customer: PPR Customer 1

Customer: PPR Customer 1     Date: 03/23/2009

| Status | Exposure Amount 000's |
|---|---|
| Amount Ordered | 671.20 |
| Deposit Paid | 672.20 |
| Fully Paid | 641.00 |
| Amount Outstanding | -01.00 |
| Amount Consumed | 636.50 |

1102 → 671.20
1104 → 672.20
1106 → 636.50

Financial Receipts by Due Date 000's:

| Forcast Period | 1 days | 7 days | 30 days | 60 days | 90 days | 120 days | 150 days | 180 days |
|---|---|---|---|---|---|---|---|---|
| Total Order Value Due | 01.00 | 03.50 | 03.00 | 00.00 | 00.00 | 09.20 | 02.00 | 02.00 |
| Payment Received | 00.00 | 00.00 | 00.00 | 00.00 | 00.00 | 00.00 | 02.00 | 02.00 |
| Outstanding Amount | 01.00 | 03.50 | 03.00 | 00.00 | 00.00 | 09.20 | 02.00 | 02.00 |

1108 (pointing to 180 days column)

Menu: Prepayment Risk Reporting ▽ / Administration / Logout / Logout

1100

Supplier Risk Exposure by Customer ← 1200

| | | | | | |
|---|---|---|---|---|---|
| Customer Name: | PPR Customer 1 ← 1202 | | Date: | 03/31/2009 | |
| Supplier Name | Supplier ABN | Supplier Exposure($) 000's | Cosumed Last 6 Months 000's | Cosumed Last 12 Months 000's | |
| Supplier 1 | 11114561111 | $0 | $25,000 | $40,000 | |
| Supplier 2 | 22224562222 | $0 | $13,000 | $18,000 | |
| Supplier 3 | 33334563333 | $0 | $18,000 | $13,000 | |
| Supplier 5 | 55554565555 | $0 | $14,000 | $19,000 | |
| Supplier 6 | 66664566666 | $0 | $7,000 | $17,000 | ← 1204 |
| Supplier 7 | 77774567777 | | $8,000 | $18,000 | |
| Supplier 8 | 88884568888 | | $7,000 | $17,000 | |
| Supplier 9 | 99994569999 | | $6,000 | $16,000 | |
| VIP | 44444564444 | | $25,000 | $35,000 | |
| Tuesday, 31March 2009 | | | Page 1 of 1 | | |

Figure 12

Investment Service - PPRS Reconciliation Exception

| Prepayment Risk Reporting | |
|---|---|
| Overview | |
| Prepayment Sales | |
| Working - Capital - Obligations | |
| Supplier Risk Exposure | |
| Input File Errors | |
| Payments | |
| Payments | |
| Payment Errors | |
| Investment Service | |
| Expiration of Security Amounts | |
| Reconciliation Exception Report | |
| Administration | |
| Customer Maintenance #2 | |
| Customer Details | |
| Security Maintenance | |
| MISC | |
| Change PWD | |
| Logout | |

Date:     Previous Business Day or Selection

Customer:    Customers. Cust_Name

PPR Fluctuating cash Security Amount $

Balance of Trading Bank PPSA: $

Difference: $

List of Transactions for PPSA Account
Date    Description    Amount
Data sourced from Account Statement Data for day of difference For each customer where the reconciliation identifies a difference, the details will appear on this report.

*End of Report*

[Export Details...]     [Print Report...]

DYNAMIC PREPAYMENT RISK MANAGEMENT

FIELD OF THE DISCLOSURE

The present disclosure relates to the management of customer credit card prepayment risk for a financial institution, and, more particularly, customer prepayment risk for financial institutions, primarily in the context of credit card sales for goods or services.

BACKGROUND OF THE DISCLOSURE

Prepayment risk represents, in essence, the value of goods or services that have been paid for using a credit card but the service or goods are to be supplied at a future date. Typical customers who may present such risks include airlines, travel agents, hospitality, education, insurance, retailers who permit lay buys or any merchant that receives payment prior to providing goods or services. The scenario is, for example, that consumers purchase concert tickets from a merchant customer of a bank, to whom a credit card facility is provided. In the event that the consumer does not receive the service for which they paid, for example in the case where the concert is cancelled, then the merchant, or if he is unable to reimburse the consumers, the merchant's bank (the acquiring bank) is obliged to reimburse the consumers, via their card issuer, for their purchases and charge this cost back to the merchant.

As such, banks may have a regulatory and/or other obligation to establish policies, systems and procedures for measuring, managing and reporting liquidity to ensure sufficient liquidity is maintained to meet their obligations arising from credit card transactions—that is to the extent of their Merchant Prepayment Exposure. Each bank has developed systems independently to measure, manage and report this exposure.

Merchant acquiring banks have typically estimated this based on regular historical reviews performed by bank staff. Banks have conventionally estimated a customer's prepayment risk by manually applying factors to the customer's sales data. In one form, annual turnover figures and an estimate of the percentage of prepayment sales may be used to assess annual exposure. Based on this estimate of exposure, the bank then determines a security deposit the customer is required to lodge to cover the assessed exposure (which may simply be a portion of an existing security).

These ad hoc manual processes are time consuming, and expose the bank to inaccuracies in its periodic risk calculation, which could lead to potential revenue and reputation risk. Further, this process may be deemed to have breached applicable regulations if inadequate measuring, managing or reporting is demonstrated. The actual quantum of exposure will vary based upon the merchant's actual trading experience, however this is not captured accurately by the existing processes.

Once an institution has established a merchant account, and thereby commenced providing acquirer services for a customer, in many cases it has no ongoing visibility of the card prepayment component which is being processed through the facility, or the potential third party risk associated with fulfilment partners such as airlines, hotels, tour operators and promoters.

A problem associated with conventional processes is that they cannot be demonstrated to accurately and consistently reflect the actual prepayment exposure. In most cases, the conventional assessment will lead to either an inadequate security deposit, which exposes the institution to greater than desirable risk, or an over-estimation of prepayment risk, placing an additional impost on a prospective client's working capital position, and on the competitiveness of the institution's services.

In view of the foregoing, it may be understood that there may be significant problems and shortcomings associated with current methods and systems for measuring, managing and reporting merchant prepayment exposure.

SUMMARY OF THE DISCLOSURE

In a broad form, the present disclosure provides an automated process for measuring managing and reporting prepayment sales associated with a customer, enabling the application of appropriate risk criteria, and adjusting the required security amount. In a preferred form, the disclosure dynamically monitors the actual prepaid transactions and permits the dynamic adjustment of security amounts while providing visibility to the customer and the bank of prepayment exposure. In so doing the disclosure enables dynamic and automatic adjustments to be made to an account corresponding to the security held.

In the context of embodiments of the disclosure described herein, a prepayment risk position arises where a credit card payment is accepted from a consumer for goods or services, and relates to the portion of those goods or services that are to be provided at a future date. The precise nature of these prepayment risks will vary from merchant to merchant, as will the materiality of the risks. Industries include, for example, airlines, travel agents, hospitality, education, concert and entertainment providers and promoters, gyms and fitness centres, insurance, and retailers who permit lay buys.

The security amount may be provided by a cash deposit, other security interests or instruments (for example, a fixed and floating charge, or a security over real property), or a combination of both. Thus, adjustment of the security amount may require actual changes to the amount in a security account held by the bank, or notional changes to the secured amount against one or more other forms of security. Preferred implementations of the present disclosure allow these changes to be made so that they accurately reflect the actual prepayment exposure, including alignment to reflect a service consumed over an extended period of time such as insurance premiums or gym memberships.

Accordingly, it can be seen that the present disclosure provides an automated process, operable from customer sales data, to provide measurement, reporting and management of prepayment risk.

BRIEF DESCRIPTION OF DRAWINGS

An illustrative embodiment of the present disclosure will now be described with reference to the accompanying drawings, in which:

FIG. 11 illustrates a Prepayment Risk—Sales Report;

FIG. 12 illustrates a Supplier Risk Exposure by Customer Report;

FIG. 20 illustrates an exemplary investment reconciliation report.

DETAILED DESCRIPTION OF EXEMPLARY EMBODIMENTS

An implementation of the present disclosure will be described with reference to a particular implementation in a bank's IT system. It will be appreciated by those skilled in the art that the precise details and implementation of any such system, and particularly its interfaces to the existing and legacy systems of a bank, will be highly dependant upon the systems architecture, applications, and the like of a particular bank. As such, the implementation provides a particular example, however, it would be expected that the details of implementation would vary from bank to bank. It is in particular emphasised that the details of the implementation are provided by way of illustration, and are not intended to be limitative of the scope of the present disclosure.

The system is intended to interact with a bank's credit system. In general terms, this is a complex software system which operates as a credit approval and processing engine. It records the key credit characteristics of customer credit facilities, and provides a mechanism by which these can be monitored and formally approved. The present disclosure can be implemented in conjunction with any suitable bank credit system. The term credit management system, or CMS, will be used to denote this system, which would be expected to be already in place in any practical implementation of this disclosure.

No particular hardware configuration is required in order to implement the disclosure. The usual design criteria for suitable servers, communication interfaces, networks, security and so forth applicable to a financial services provider need to be followed. Regard should be had to expected transaction volumes. It would be expected that a current implementation would use client/server and distributed processing techniques.

Whilst for convenience the term 'bank' will be used, the present disclosure is applicable to any institution providing acquirer services which may incur prepayment risk. The term UCR, or unique customer reference, will be used for a unique internal bank reference which identifies a specific customer. This may take a variety of forms, as is well known in the field. A Customer Information System (CIS) key is a specific example of a UCR.

Figure 1A:
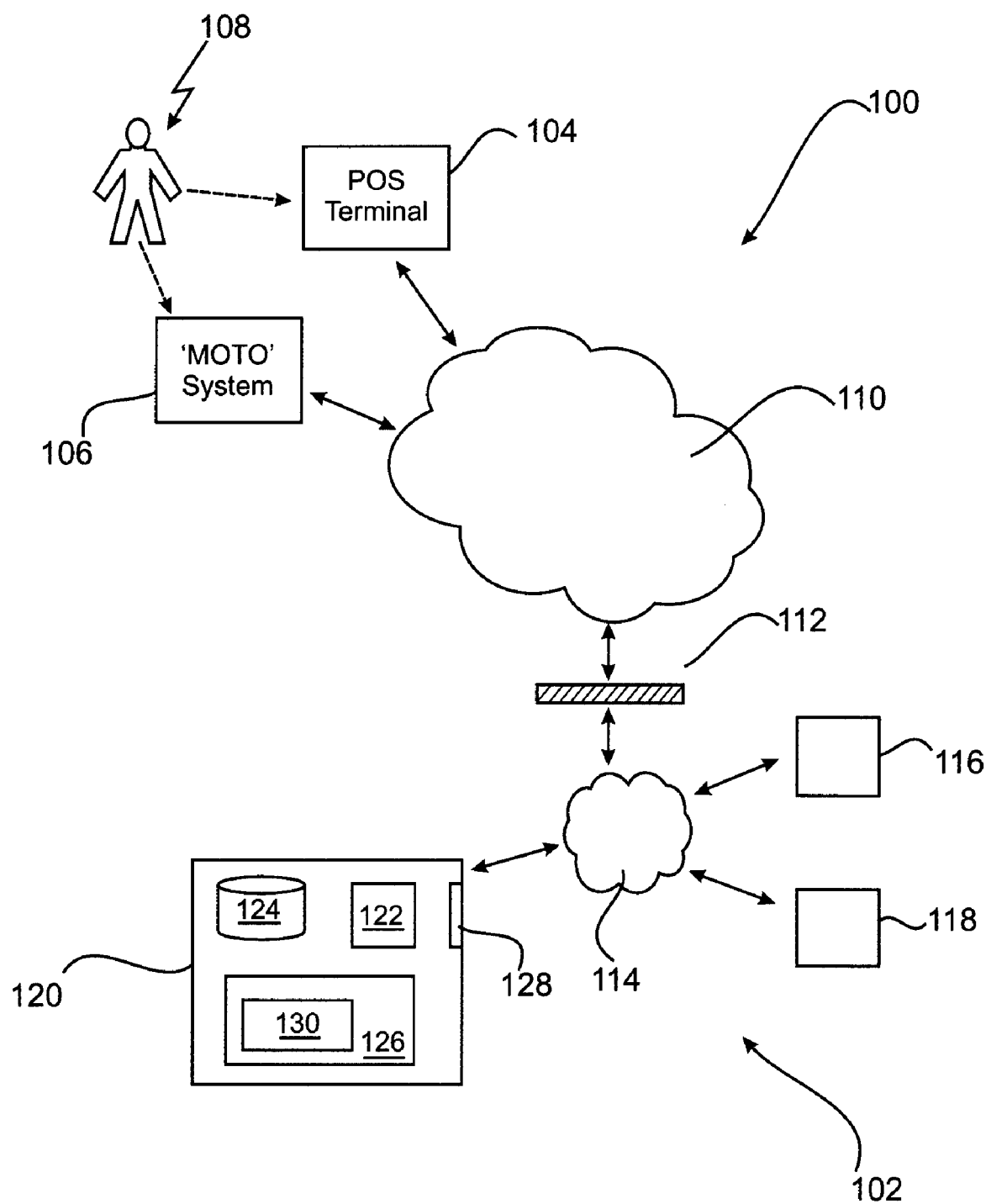
FIGS. 1(a) and 1(b) are block diagrams illustrating schematically a preferred embodiment of the present disclosure.
Figure 1B:
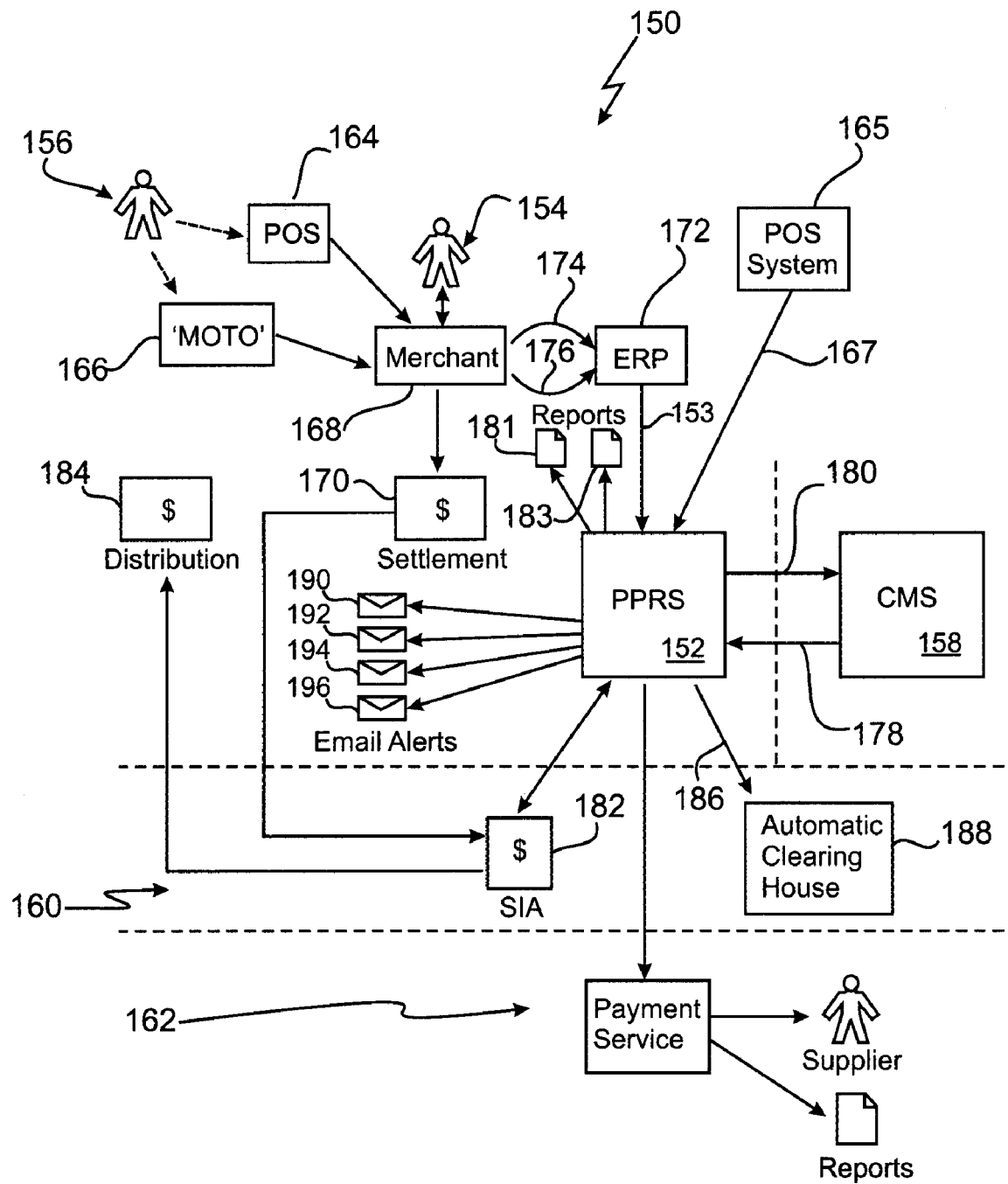

FIG. 1 provides a general overview of a preferred embodiment of the present disclosure. In particular, FIG. 1(a) is a block diagram 100 showing schematically an exemplary hardware architecture, while FIG. 1(b) is a block diagram 150 showing a corresponding software system architecture. The system architecture includes two main components 152, 158, as well as two optional components 156, 158.

Turning firstly to FIG. 1(a), the exemplary system 100 includes the bank's IT systems 102, which are connected to merchant systems 104, 106 configured to receive payments from consumers 108, via one or more interconnecting networks 110. The merchant payment systems may include Point of Sale (POS) terminals 104, and/or Mail Order Telephone Order (MOTO) systems 106. MOTO systems include telephone and paper-based ordering systems, as well as eCommerce systems enabling consumers to purchase goods or services via the Internet. In any event, the payment terminals 104, 106 enable a merchant to receive credit card payments from a consumer 108.

The networks 110 may include one or more private and/or public data communications networks. As will be appreciated, such networks may or may not provide inherent security of transmitted data. For example, a connection between a POS terminal 104 and a bank system 102 may comprise a switched telephone connection over the Public Switched Telephone Network (PSTN), which is relatively secure against the unauthorised interception of transmitted information. Alternatively, a connection between an MOTO system 106 and the bank IT system 102 may be provided via the Internet, which is an inherently insecure network in which transmitted data must be treated as open and visible to third parties. In either case, however, an appropriate level of security for the transmission of transaction information may be provided through the use of suitable authentication and encryption technologies, as are well-known in the art.

The bank's server systems are typically located behind a "firewall" 112, which is configured to prevent unauthorised access to services and sensitive financial data maintained by the bank's IT systems 102. In particular, the firewall 112 isolates the bank's secure internal networks 114 from external untrusted networks 110. The internal network 114 interconnects various components of the IT system 102, such as various server systems, eg 116, 118, 120. Embodiments of the present disclosure may be implemented utilising the services and facilities of one or more distinct hardware server systems, utilising distributed computing methodologies, however for simplicity the implementation of an exemplary embodiment is described with reference to a single server 120.

As shown in FIG. 1(a), server system 120 comprises a conventional computer architecture, from which details irrelevant to implementation of the present disclosure have been omitted. Relevantly, the server 120 includes at least one microprocessor 122, which is interfaced, or otherwise associated, with a high-capacity non-volatile memory/storage device 124, such as one or more hard disk drives. The storage device 124 typically contains programs and data required for the operation of the server 120, and for the implementation and operation of various software components embodying the present disclosure. The programmatic means (eg choice of programming language and platform) by which this may be achieved, given suitable requirements specifications, are well-known in the art, and accordingly will not be discussed in detail herein.

The server 120 further includes an additional storage medium 126, typically being a suitable type of volatile memory, such as Random Access Memory, for containing program instructions and transient data relating to the operation of the server 120. Additionally, the server 120 includes a network interface 128, accessible to the microprocessor 122, facilitating communications with other devices and systems connected directly or indirectly via the internal bank network 114.

The server memory device 126 contains a body of program instructions 130 embodying various software-implemented features of the present disclosure, as described in greater detail below with reference to the remaining drawings. In general, these features include data processing functions, transaction processing functions, and database management functions, implementing an automated process adapted to manage credit card prepayment exposure for the bank with respect to one or more merchants.

The various databases maintained in the course of operation of preferred embodiments of the present disclosure may be maintained on the non-volatile storage device 124 of the server 120, and/or may be maintained by other servers, eg 116, 118, that are accessible to the server 120 via the bank network 114 in accordance with conventional remote database access methods.

Turning now to FIG. 1(b), there is shown a corresponding software system architecture 150 embodying the present disclosure. The software architecture 150 comprises four components 152, 158, 160, 162, two of which are central to the implementation, and two of which provide optional, but preferred, features.

The first main component of the system 150 is the Prepayment Risk System (PPRS) 152. The second main component is a Dynamic Risk Mitigation function, which is based upon the bank's existing Credit Management System (CMS) 158. The first optional component 160 provides an automated investment feature. The final component 162, also optional, provides an automated payment service feature. Further details of the functions provided by each of these four components are described below.

PPRS (152)

The PPRS component 152 provides a system that can take a dynamic data feed 153 from customers 154 relating to their actual sales that carry prepayment risk. The data is sorted and monitored by reference to expected dates for delivery of the goods, or service provision to the merchant's customer 156, so as to give a detailed view of prepayment risk by components and date. This system will therefore identify and report, as far as is possible, a dynamic picture of the actual prepayment exposure, allowing the bank to measure, manage and report its prepayment risk exposure and provide the customer with visibility of the agreed security arrangements and the dynamic alignment of the security held to cover the actual prepayment risk.

Dynamic Risk Mitigation (158)

The dynamic risk mitigation component, based upon the bank's CMS 158, will ensure that a predetermined level of security to cover the bank's actual prepayment exposure is held. This level will be agreed in advance with the customer 154, and will operate at different percentages for different customers. The dynamic data feed 153 from the customer allows the system to monitor and instruct daily sweeping of prepaid funds from and to the customer (as prepaid sales change) to ensure the predetermined level of security is held against actual prepayment exposure from the customer. This system also is integrated with the bank's Credit systems in order to reflect the dynamic mitigation in the calculated Total Approved Exposure (TAE) figure. This reassessment of TAE will allow the bank to make more informed decisions regarding merchant facility limits.

Automated Investment (160)

The Automated Investment component 160 is an optional feature that provides the ability to drive investment of the cash security held by the bank based on the information provided by the customer on its payment obligations. The system will report on investments made and the expiration of these investments. By offering an investment facility in the solution, the bank may provide customers with an improved return on the funds the bank holds as cash security.

Payments Service Component (162)

The optional Payments Service component 162 provides the enhanced ability to deliver an end-to-end 'outsourcing' of payments by utilising the customer's supplier payment information to automatically create payment files for processing or customer approval on the due date. This will involve interfacing to an existing payment service offered by the bank, or a service provider.

Turning now in more detail to FIG. 1(b), a consumer 156 initiates a prepayment transaction with a merchant 152. This may be using a transaction via a Point of Sale (POS) terminal 164 where the consumer's credit card is present or a Mail Order Telephone Order (MOTO) transaction, for example via a computer 166 over the Internet, where the merchant does not sight the card or signature. The purchase is recorded by the merchant 154, forming part of the merchant's prepaid funds 168, with the funds going to the respective merchant settlement account 170.

The payment is also processed 174 through the merchant's Enterprise Resource Planning (ERP) system 172, where the transaction data is associated with a particular service, itinerary, etc. Data may also be input or updated 176 regarding operational issues and needs relating to each transaction and/or individual components of a transaction, for example, cancelled bookings, alterations to ticketing, etc. From the ERP system 172, a daily transaction feed 153 is provided to the PPRS 152. The PPRS 152 also receives, via the point of sale system 165 or other merchant system utilised by the merchant, merchant data to allow for a cross check of sales.

The PPRS 152 further exchanges data with the bank's credit system 158 (dynamic risk mitigation as above), both as to the permitted credit limits and conditions 178, and as to the current state of the merchant's trading and risk 180. The PPRS 152 is also configured to generate reports for the internal PPR reporting function 181, as well as customer reports 183, as will be explained in detail below.

The PPRS 152 applies business rules and protocols, as will be explained further below, and produces a variety of outputs. It executes calculations, and reconciles sales totals from the ERP system 172 with the merchant's sales value for the previous day, so as to allow for an accurate assessment of prepayment risk. It moves previously flagged archive data (eg sales where the goods have been supplied) to the data store, and manages the components of sales which are now past their consumption date.

In the exemplary embodiment, the PPRS 152 also determines, on a dynamic basis, the prepayment exposure and hence required security deposit for a particular merchant, and reconciles this to the merchant's security balance. It appropriately automatically authorises the release of portions of the customer security investment account 182 to the customer, when goods or services have been provided, so as to release working capital to the customer distribution account 184. It also, as appropriate, sends a request for further security funds, and/or acquires funds from nominated accounts, should the risk assessment indicate that this is required. This may be, for example from the merchant settlement account 170 to the customer security investment account 182. It should be appreciated, however, that this represents only one possible security arrangement, and that alternative forms of security may be employed and maintained, in accordance with bank and/or customer requirements, and within any applicable regulatory framework.

FIG. 1(*b*) indicates possible timings for various processes, which are illustrative of this example only, but provide an idea of the practical sequencing of this process. In particular, at 9:00 pm daily transaction data 153 is transferred from the merchant ERP system 172 to the PPRS 152. Transfer of data 180 to the CMS system 158 is scheduled to commence at midnight daily, where processing occurs at around midday, for transfer of updated information 178 back to the PPRS 152 at around 1:00 pm. Prior to 5:00 pm each day (ie close of business) an ACH file 186 is transferred to Automatic Clearing House (ACH) 188 to facilitate required funds transfers. Additional overnight operations include conducting balance checks, and the generation of alert messages 190, 192, 194, 196.

Also shown are various alerts and reports which are provided to the internal bank PPRS manager and other nominated staff. These include, as shown, an alert message 190 if PPRS and security investment account (SIA) do not reconcile; an alert message 192 where POS and ERP data exceed some tolerance of discrepancy; an alert message 194 if the PPR exposure limit is breached; and a weekly alert message 196 where credit changes have been awaiting approval for more than a week. These alerts may be provided, for example, by email or any other suitable arrangement.

The importance of the interaction with the general dynamic risk mitigation system 158 is significant. This allows for the general bank credit systems to interact effectively with the PPRS 152. As illustrated, a details report 180 of customer detail, calculated fluctuating cash security and prepaid sales is passed to the CMS system 158. After processing, a revised set 178 of customer detail, including calculated fixed security and non-fluctuating security floor approved, are sent to the PPRS 152.

In accordance with the optional investment feature of the preferred embodiment, FIG. 1(*b*) further illustrates the customer security investment account (SIA) 182. This account provides a special rate of interest. Interest earned may be transferred directly to the customer distribution account 184. As described, funds flow into and out of the SIA account 182 in accordance with changes in prepayment exposure. This account is not generally accessible to the customer 154, although the balances and transactions can be seen on customer reports.

A critical aspect of practical operation of the system 150 is that the customer data is received and includes sufficient data to enable individual components of the order to be identified as part of the risk management process, and to be updated or deleted.

An Order and Components file is transmitted from the merchant ERP 172 to the PPRS 152, in order to update a database of Orders placed including the individual components that make up the order (eg flights, accommodation, tours, etc) and the associated payment method. The file can be for new orders and components; to update orders or components within an order; or to delete orders or components within an order.

This file is critical to the implementation as it also provides the records of suppliers that orders and components are calculated against in the system. The details contained in this file are loaded into the system 150 for any customer for whom the system 150 is being implemented. Supplier IDs contained in this file are required to be loaded to form a static Supplier File that contains, for each supplier, a unique Supplier Identifier and Name.

The customer 154 transmits an Order and Components file by a suitable secure file transmission service, which is then passed to the PPRS 152 for importing. The files may be sent to the bank utilising the standard electronic file transport, security and network connectivity methods offered by the bank. Manual handling of files by CD or email for importing is a less-preferred, but possible alternative transmission method if required. Authentication processes are used to verify uniqueness of files is maintained. For example, in one implementation the file will be checked for uniqueness by the Managed File Transfer System (MFT) using a hash algorithm. MFT is a particular system utilised internally by the application for file transfer. Table 1 provides details of particular actions and functionality provided by the system.

TABLE 1

Receipt and Import of Order and Components File

| # | Action | System Response |
|---|---|---|
| 1 | File is transmitted to MFT using the selected file transport, network connectivity and security mechanism. | MFT Managed File Transfer system acknowledges file successfully transmitted. |
| 2 | Managed File Transfer checks for duplicate file | Where a duplicate file is encountered standard error alerting will be completed. |
| 3 | File is passed to MFT Prepayment Risk System | MFT Managed File Transfer system acknowledges file issued to Prepayment Risk System. |
| 4 | Records within file are checked against import validation rules | Errors encountered in the file against validation rules are reported in 'Customer Input File Errors' Reports |
| 5 | Records are committed to database. | Update records will query and update record, new records will write new records to database. |

Table 2 provides details of optional responses and/or exception responses to actions within an implementation of the customer data input aspect of the system.

TABLE 2

Optional and/or Exception Response to Customer Input

| # | Action | System Response |
|---|---|---|
| 1 | Customer or Bank File Transmission method is unavailable | Wait until service is restored. |
| 2 | Customer is unsure as to whether file has been transmitted. | Customer should refer to MFT File Transmission dash board. |
| 3 | File transmitted is duplicate to one previously transmitted. | File will be reported as duplicate by customer email alert and in the MFT File Transmission dash board. |
| 4 | Customer data contained in records is found to be incorrect by customer after transmission and import has been completed. | Customer must issue subsequent file with either update or cancel records, then a further file may be required to add or modify records to correct errors. No manual manipulation of databases is offered. Customer will need to determine course of action to rectify errors. |

It is preferred that the customer file utilises an XML or other agreed format with tags throughout to identify the customer transmitting the file and that all data is present in the properly structured file. Components will be nested inside an Order XML or other agreed structure. A suitable specification for the file is set out in Table 3.

TABLE 3

Customer File Specification

| Field Name | M/O | Field Description | Suggested Destination Table |
|---|---|---|---|
| PPR_ID | M | Prepayment Risk System ID which is automatically generated at Customer Implementation. | Customer.Customer_Ref |
| File Date | M | Date that the file is generated by the Customer's System. | Used for file tracking and duplicate checking purposes. |
| File Type | M | Defines this file as a PPR Orders and Components File | Used by PPR system to determine what logic is to be applied to file import. |
| Order_Ref | M | A Unique Identifier/Reference # assigned by the Customer's system to each Order. | Sales.Order_Ref |
| Order_Date | M | The date on which the Order was made by the Customer's client. | Sales.Order_Date |
| Total_Order_Value ($) | M | The total $ value of the Order | Sales.Total_Order_Value |
| Order_CCY | M | The currency that the Total_Order_Value is received in | Sales.Order_CCY |
| Order_Consumption_Start_Date | M | The date on which the first Component of the Order starts. | Sales.Order_Consumption_Start_Date |
| Order_Consumption_End_Date | M | The date on which the last Component of the Order ends | Sales.Order_Consumption_End_Date |
| Order_Status | M | Field that specifies whether the Order is new order, an update on an existing order or a cancellation of an order. Three options allowed "New", "Update" & "Cancel". | Sales.Order_Status |
| Component_Ref | M | A Unique Identifier/Reference # assigned by the Customer's system to each Component of an Order of the Customer's client. | Sales.Component_Ref Supplier_Components.Component_Ref |
| Component_Sale_Date | M | The date on which the specific Component was sold to the customer's client. | Sales.Component_Sale_Date |
| Component_Type | M | Specifies the type of Component eg Flight, Hotel Booking, Music Concert etc. | Sales.Component_Type Supplier_Components.Component_Type |
| Component_Value | M | The $ value of the specific Component. | Sales.Component_Value |
| Component_CCY | M | The currency that the Component_Value is received in | Sales.Component_CCY |
| Component_Payment_Due_Date | M | The date in which the full payment for the component amount is due. | Sales.Component_Due_Date |
| Component_Start_Date | M | The date which the specific Component is due to begin. | Sales.Component_Start_Date |
| Component_Finish_Date | M | The date which the specific Component is due to finish | Sales.Component_End_Date |

TABLE 3-continued

Customer File Specification

| Field Name | M/O | Field Description | Suggested Destination Table |
|---|---|---|---|
| Component_Supplier_ABN | M | A Unique Identifier/Reference # assigned by the Customer's system to each Supplier of the specific Component. (As Suppliers arise in the Order & Components file, their ABN and name will be added to the static Supplier Table). | Sales.Component_Supplier_ABN |
| Component_Supplier_Name | M | The Name of the Supplier attached to the Component | Sales.Component_Supplier_Name |
| Component_Status | M | Specifies whether the Component is a new component, an update to an existing component or a cancellation of an existing component within an order. Three options allowed "New", "Update" & "Cancel". | Sales.Component_Status |

Import errors and warnings are written to a log file that is available for the customer to view within 'File Import Error' screens displayable by the system 150. Error messages will apply to each record as applicable and provide the customer with a meaningful description of the error encountered.

Figure 2:
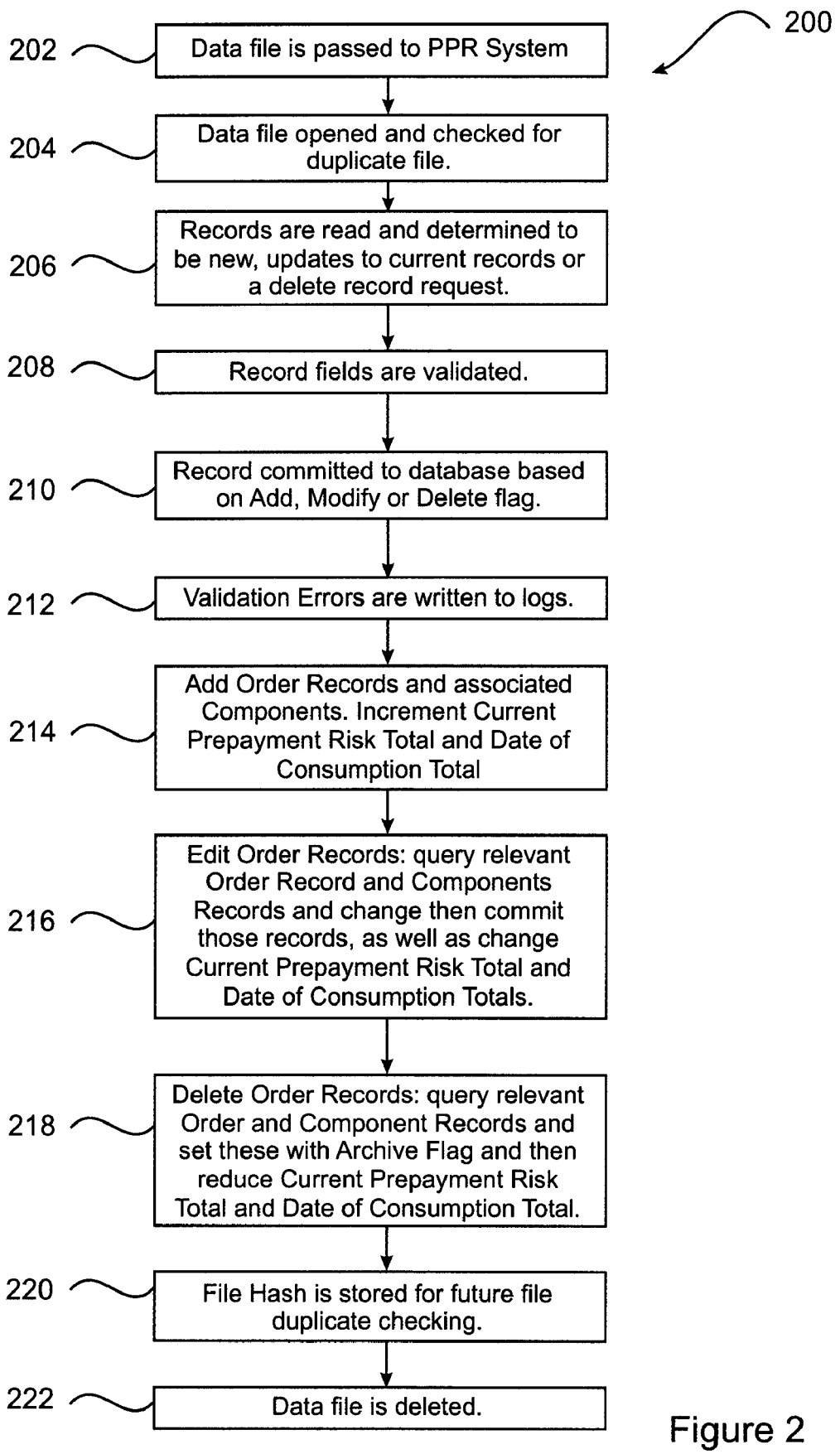
FIG. 2 is an import process when an Order and Components file from the merchant is sent to the prepayment risk system according to the preferred embodiment.

FIG. 2 illustrates a flowchart 200 of the process for importing and processing the customer order file. In particular, at step 202 the Customer Order File 153 is transferred from the merchant ERP system 172 to the PPRS 152. The PPRS opens the data file, and checks for duplicate data, at step 204. The PPRS then reads the records in the file, at step 206, and determines whether each record is a new order, an update to an existing records (eg as a result of a change in travel itinerary or the like), or a request to delete a record (eg due to fulfilment of an order). At step 208 the record fields are validated, and at step 210 the record is committed to the database in accordance with type (ie new, modification, or deletion). Any validation errors that may occur are written to appropriate logs at step 212.

Step 214 represents the processing by the PPRS 152 of the new order records and associated components. In particular, the current prepayment risk total is increased, and the date of consumption total updated, in order to reflect the newly added transaction data. Step 216 represents processing of the update requests, which includes querying of the relevant order records and components records, performing the required updates, and then committing the changes back to the database. Any required updates to the current prepayment risk total and date of consumption totals are also made. Step 218 represents the processing of delete order requests, which involves querying the database for relevant order and component records, marking these for archive, and making the corresponding reductions to the current prepayment risk total and date of consumption totals.

At step 220, a hash of the data file is computed, and stored to facilitate future checking for duplicate file submissions. Finally, at step 222 the data file is deleted.

A receipts file contains details of payments made against Orders and Components placed. Receipts are an essential part of the risk equation, as they reflect the payments which are potentially at risk.

The customer transmits a Receipts file by a Managed File Transmission (MFT) Service. On receipt of the file, the MFT will pass the file to the Prepayment Risk system for importing. This is handled in a similar way to the Order and Components file, with similar requirements.

Table 4 indicates actions, and the appropriate system response.

TABLE 4

Receipt and Import of Receipts File

| # | Action | System Response |
|---|---|---|
| 1 | File is transmitted to MFT using the selected file transport, network connectivity and security mechanism. | MFT Managed File Transfer system acknowledges file successfully transmitted. |
| 2 | Managed File Transfer checks for duplicate file | Where a duplicate file is encountered standard error alerting will be completed. |
| 3 | File is passed to MFT Prepayment Risk System | MFT Managed File Transfer system acknowledges file issued to Prepayment Risk System. |
| 4 | Records within file are checked against import validation rules | Errors encountered in the file against validation rules are reported in 'Customer Input File Errors' Reports |
| 5 | Records are committed to database. | Update records will query and update record, new records will write new records to database. |

Optional and alternative responses, and exceptions, may be similar or the same as those disclosed for the Order and Components process, as set out in Table 2.

The Receipts file will utilise an XML or agreed format with tags throughout to identify the customer transmitting the file and that all data is present in the properly structured file. As for the Orders and components, import errors and warnings are preferably written to a log file that is available for the customer to view within 'File Import Error' screens. Error messages will apply to each record as applicable and provide the customer with a meaningful description of the error encountered. Error Message text will be determined during import event software build.

A suitable specification for the Receipts file is set out in Table 5.

TABLE 5

Receipts File Specification

| Field Name | M/O | Field Description | Destination Table |
|---|---|---|---|
| PPR_ID | M | Prepayment Risk System ID automatically generated at Customer Implementation. | Customer.Customer_Ref |
| File Date | M | Date that the file is generated by the Customer's System. | Used for file tracking and duplicate checking purposes. |
| File Type | M | Defines this file as a PPR Receipts File | Used by PPR system to determine what logic is to be applied to file import. |
| Receipt_Ref | M | A Unique Identifier/Reference # assigned by the Customer's system to each Receipt of payment for an Order. | Receipts.Receipt_Ref |
| Order_Ref | M | The Reference of the Order which the Receipt record relates to | Receipts.Order_Ref |
| Receipt_Date | M | The date on which the $ value is received as payment towards the Order | Receipts.Receipt_Date |
| Receipt_Value | M | The value ($) received as payment towards the Order. | Receipts.Receipt_Value |
| Receipt_Currency | M | Currency that value was paid in. | Receipts.Receipt_Currency |
| Receipt_Method | M | The method by which the Receipt_Value is received. Options include "Credit-MasterCard", "Credit-Visa", "Credit-Amex", "Credit-Diners", "Debit", "Cash" & "Cheque" | Receipts.Receipt_Method |

Figure 3:
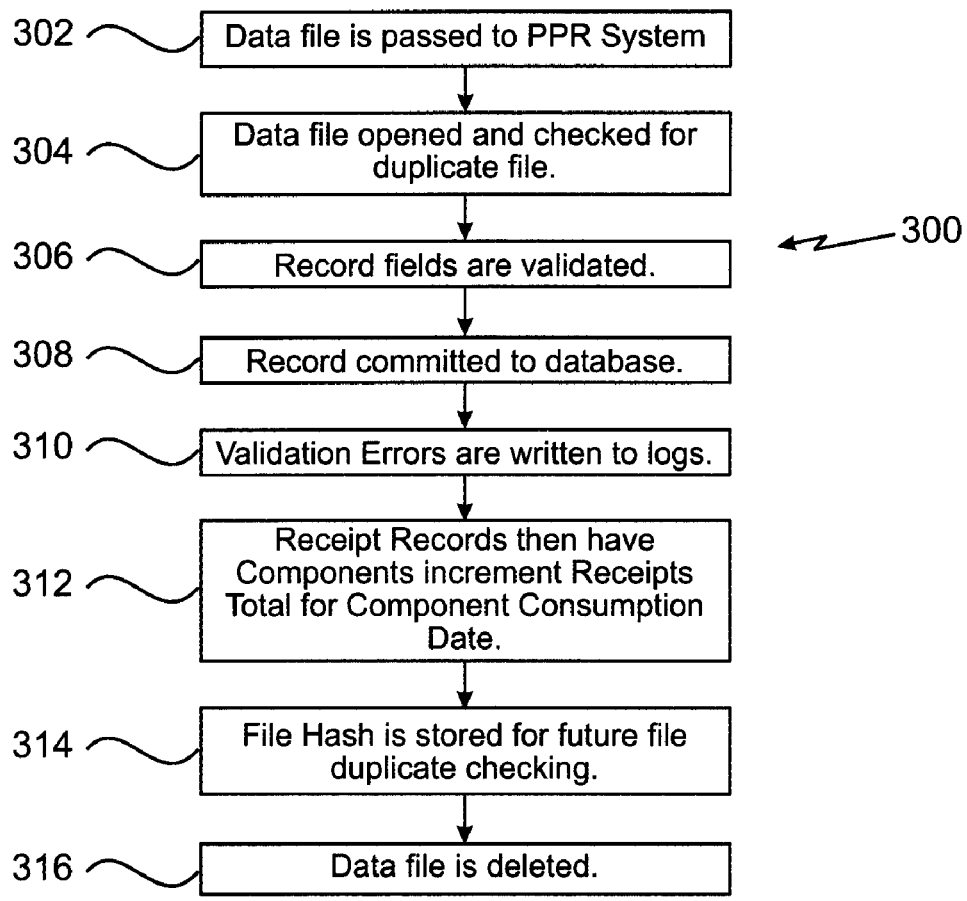
FIG. 3 is a flowchart illustrating an import process when a Receipts file from the merchant is sent to the prepayment risk system according to the preferred embodiment.

FIG. 3 illustrates a flowchart 300 of the process for importing and processing the Receipts file. In particular, at step 302 the Receipts data file is passed to the PPRS 152, and the file is then opened and checked to ensure that it is not a duplicate of a previously received file, at step 304. At step 306, the record fields are validated, and valid records committed to the database at step 308. Any validation errors are written to appropriate logs at step 310.

At step 312, the new records are processed and components of existing orders are updated in order to reflect the amounts received.

A hash of the Receipts file is computed at step 314, and stored to facilitate future checking for duplicate files. Finally, at step 316, the Receipts data file is deleted.

Users on the system will need to be appropriately controlled and operate using a user name and password, as is conventional. Depending upon the management structure at the bank, a wide range of staff will need to be users, with different levels of access. Appropriate levels of access, and operation of components of the system, are provided through a suitable user interlace. In the preferred embodiment, the user interface is provided via the bank's internal network 114 and/or the external networks 110 as a web browser-based interface. Advantageously, this enables users of the system to access its services via any conventional personal computer, or other web-enabled device, using standard web browsing software. No specific client software is therefore required to be deployed to user terminals. The interface is therefore implemented, in a conventional manner, by providing a web server within the bank's IT system 102 using, for example, a Microsoft ASP framework to deliver the web-based services. A number of features and components of the user interface are described below with reference to FIGS. 4 to 19.

Figure 4:
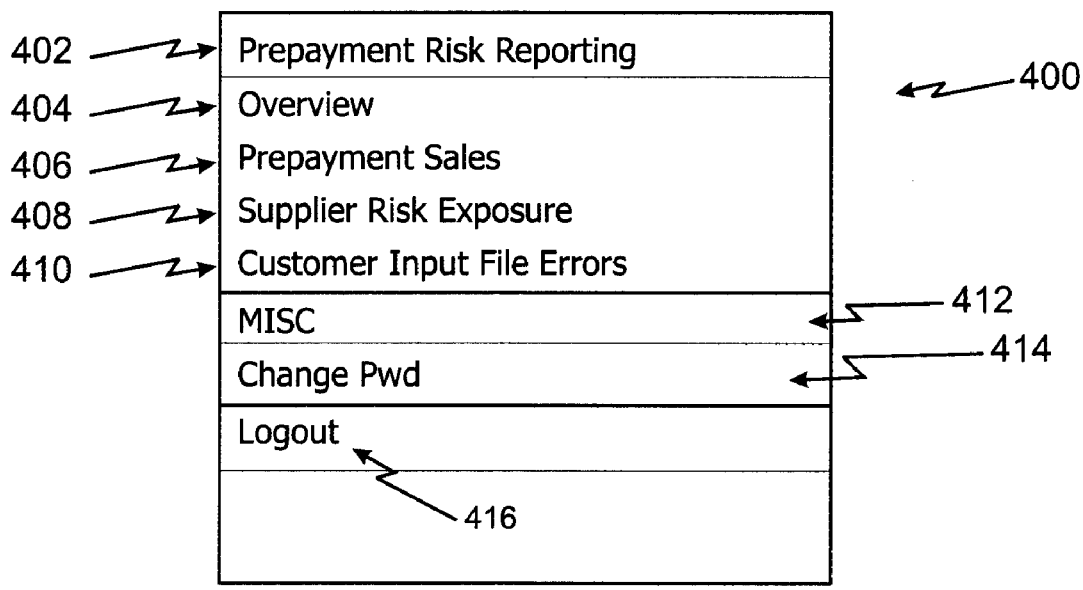
FIG. 4 is an example of a navigational screen that may be displayed for a customer.
Figure 5:
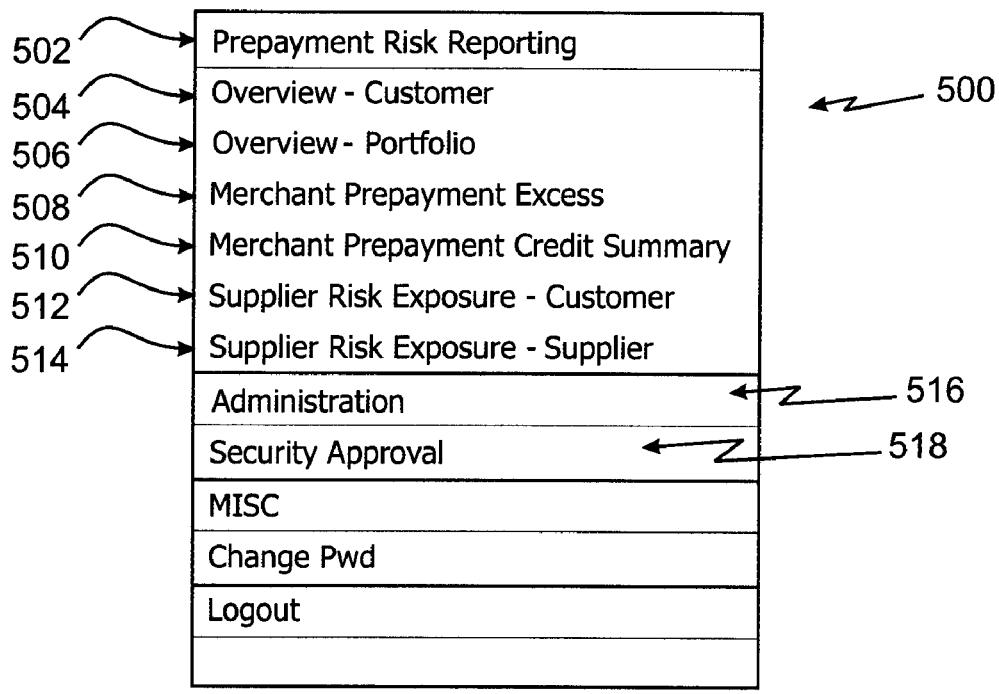
FIG. 5 is an example of a navigational screen that may be displayed for the bank's credit group.
Figure 6:
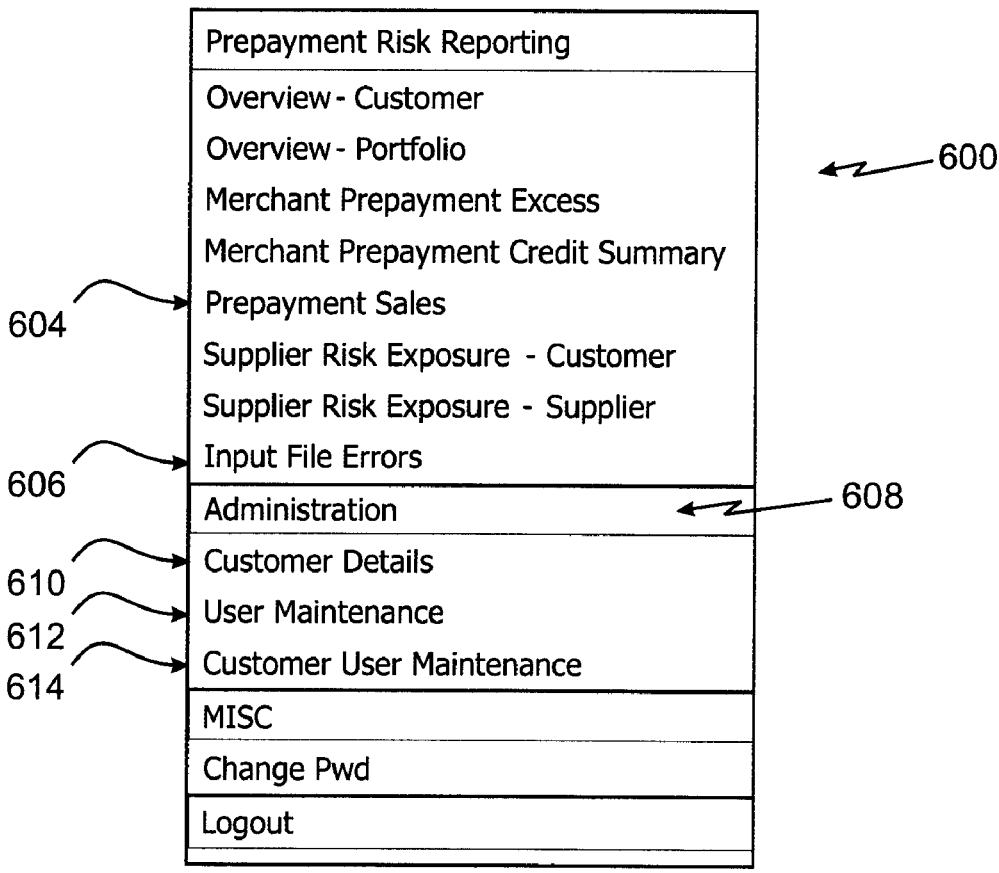
FIG. 6 is an example of a navigational screen that may be displayed for the bank's product manager.

With reference to the provision of different facilities and levels of access to different users of the system, FIGS. 4, 5 and 6 illustrate menus of actions that are made available to customers, credit staff, and product managers, respectively. In particular, FIG. 4 shows a menu 400 available to a merchant customer. The menu 400 provides the customer with a category of options 402 relating to prepayment risk reporting. These include providing an overview 404 of prepayment risk information, a report of prepayment sales 406, a report of supplier risk exposure 408, and a report relating to customer input file errors 410. In a miscellaneous category 412, the customer is provided with an option 414 to change the account password. Finally, a log-out option is provided 416.

As shown in the menu 500 in FIG. 5, a different set of facilities is provided to a member of the bank's credit staff. In the prepayment risk reporting category 502, the staff member is able to obtain an overview 504 for a particular selected customer, an overview 506 for a particular selected portfolio, to access a merchant prepayment excess report 508, to access a merchant prepayment credit summary report 510, and to access supplier risk exposure reports, from either the customer perspective 512 or supplier perspective 514. Within an administration category 516, the credit staff member is able to access a security approval screen 518. In like manner to the customer menu 400, the credit staff menu 500 also enables the staff member to change their password, and to log out of the system.

As shown in the menu 600 in FIG. 6, a PPRS product manager has access to many of the same features of the system as the credit staff member, with the exception of security approval 518, and with the addition of some features that are specific to the product management role. In particular, the product manager is able to access a report of prepayment sales 604, reports of input file errors 606, and to perform administration tasks in relation to customer details 610, user maintenance 612, and customer user maintenance 614.

Various of the reports and administrative facilities provided through the menus 400, 500, 600 are described in greater detail below with reference to the remaining figures.

Figure 7:
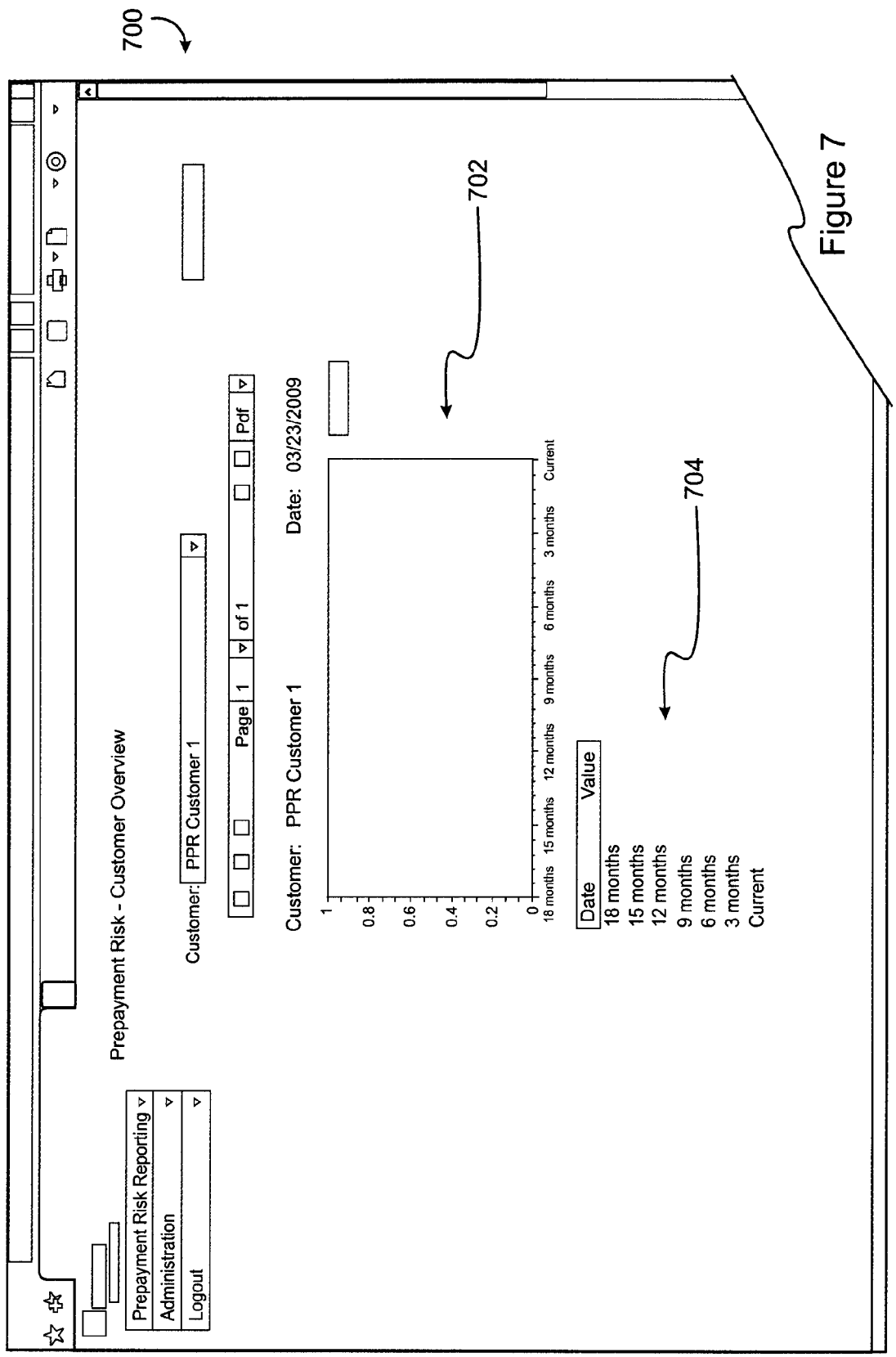
FIG. 7 illustrates a Prepayment Risk—Customer Overview report.

One of the important aspects of the system 150 is that it enables appropriate, dynamic reports to be made available to the merchant, detailing the prepayment situation, and allowing the merchant to manage cash flow, working capital and so forth. Preferably, this allows the viewing of risk data over various historical time periods, eg today, a month ago, three months ago, and so forth. FIG. 7 illustrates a screen shot 700 of such a report generated by the customer from the user interface of the system 150. This displays the historical prepayment risk of a selected Customer, eg in a graphical 702 and/or tabulated 704 format. It provides the Customer with a single page view of its prepayment risk position.

Figure 8:
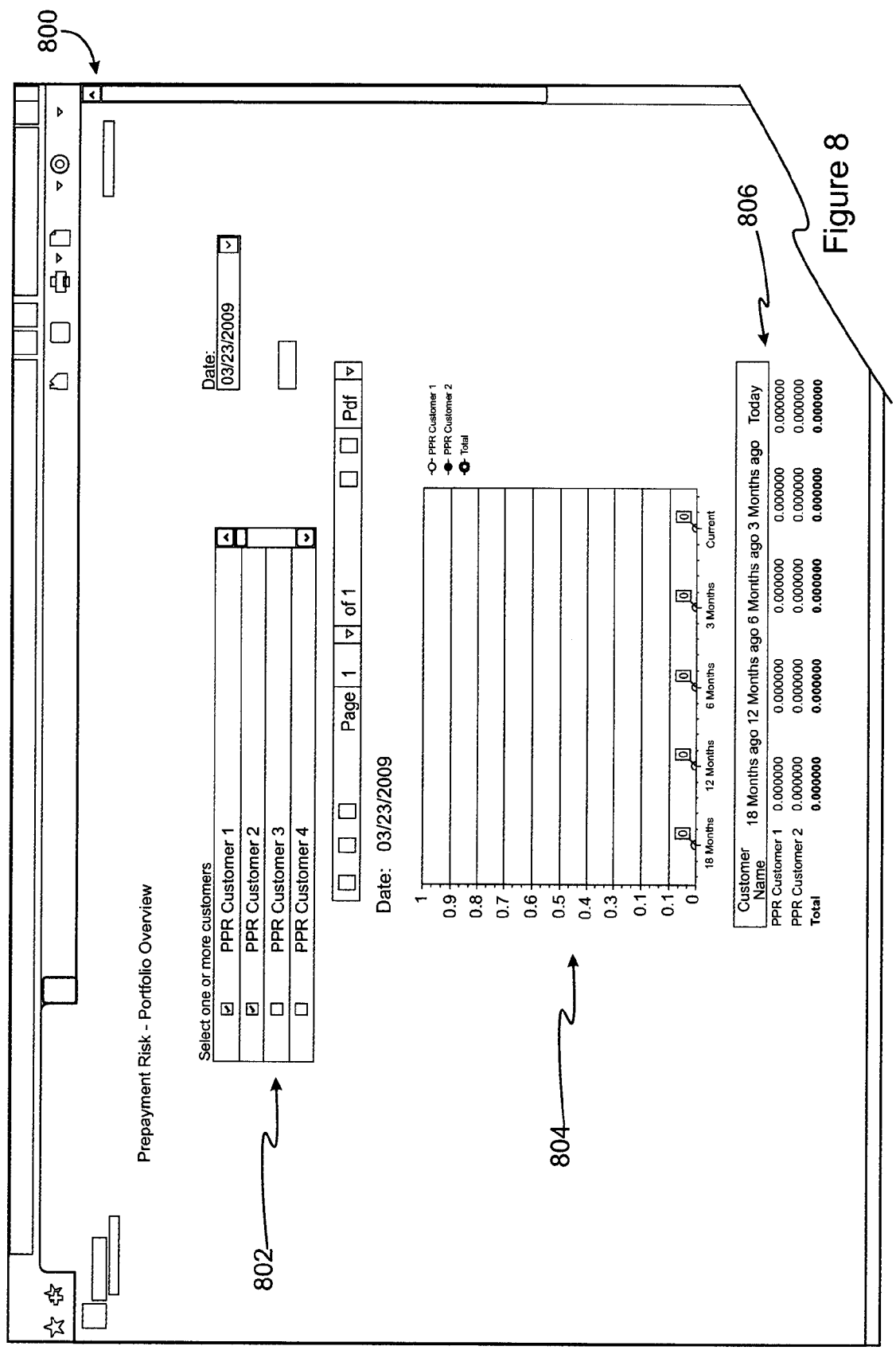
FIG. 8 illustrates a Prepayment Risk—Portfolio Overview report.

Similarly, the bank will require appropriate reports for managing its risk. FIG. 8 illustrates a screenshot 800 of a portfolio view across customers. This displays the prepayment risk overview for a customised portfolio of customers. A number of customers can be selected from a list 802 to see a consolidated view of prepayment risk of all selected customers, eg in a graphical 804 and/or tabular 806 format. Therefore reporting of prepayment risk is available by totaling up risk figures for all customers within a portfolio of customers in the system.

Figure 9:
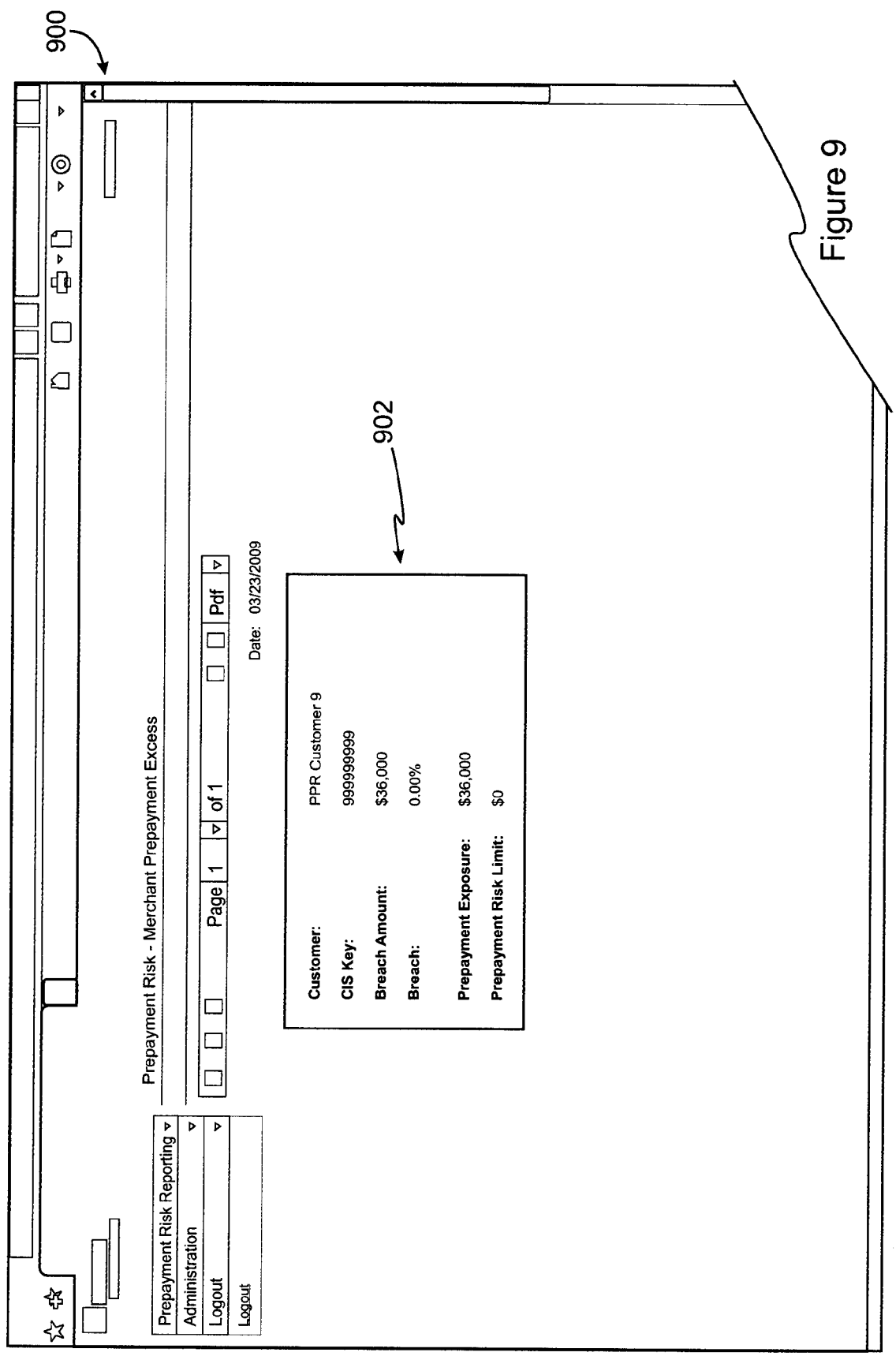
FIG. 9 illustrates a Merchant Prepayment Excess report.

FIG. 9 illustrates a screenshot 900 of a report identifying customers with a prepayment excess. Where a customer varies from agreed security arrangements, this report will identify, ie as in pane 902, any customer exceeding approved arrangements.

Figure 10:
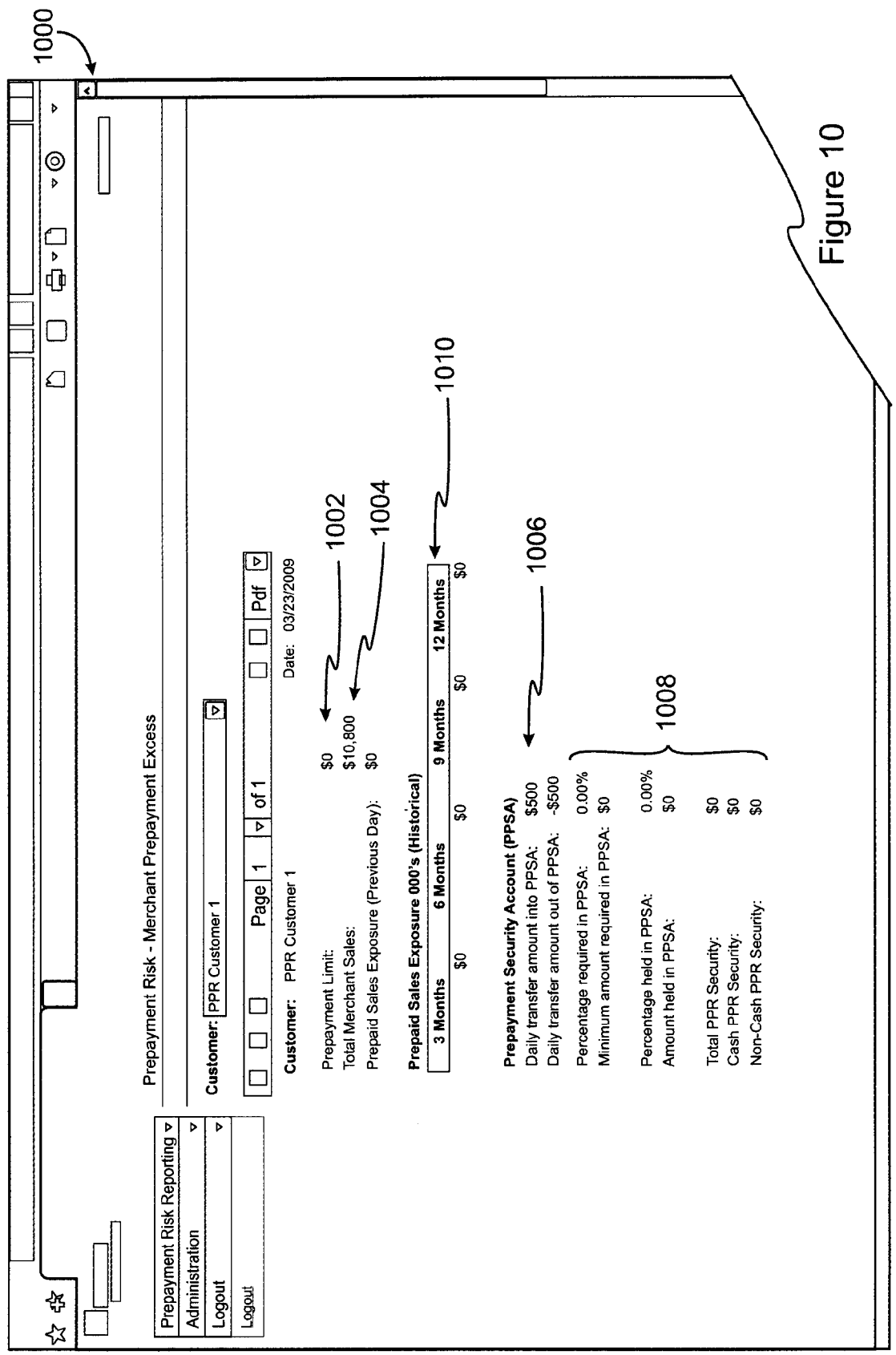
FIG. 10 illustrates a Merchant Prepayment Credit Summary.

FIG. 10 illustrates a screenshot 1000 of a merchant prepayment credit summary, identifying prepayment limits 1002, sales 1004, transfers 1006, and so forth. It includes a security overview 1008 for prepayment risk. It also provides bank staff with historical information 1010 to provide forecast analysis of the prepayment position.

Another report, useful both to the customer and the bank, is a summary of prepayment sales, value received against the sales, and the expected amount from the consumer. A screenshot 1100 of such a report is illustrated in FIG. 11. This displays the spread of sales value by receipt status and financial receipts due by date. In particular, the report displays the prepayment sales 1102, value received against the sale 1104, and the expected amount from the consumer 1106. Also in this report is a table 1108 showing the amount of outstanding receipts and the expected receipt dates.

Another aspect of assistance to both the bank and the customer is to have a report detailing risk exposure by the various suppliers to the customer, as illustrated in the screenshot 1200 in FIG. 12. For non-customer users, a customer name drop down list will be presented, so that the customer to be reported on may be selected. For a customer user, a customer name field 1202 is already pre-populated. The user can select one particular supplier or all suppliers—to see the exposure of that supplier. A table 1204 displays the total exposure to individual suppliers over time providing a view of third party risk, ie the risk exposure to the suppliers of customers. It will be appreciated that in some instances, for example travel agents, multiple merchants may have exposures to the same suppliers.

To prepare the report 1200, database tables will be queried to determine the total exposure for the day for each supplier displayed. Where multiple suppliers are to be displayed, the top 50 will be shown determined by sorting value from largest amount to smallest amount, then the corresponding monthly consumed totals will be calculated to create total consumed for six months and 12 months, albeit these will not be in largest to smallest order.

Figure 13:
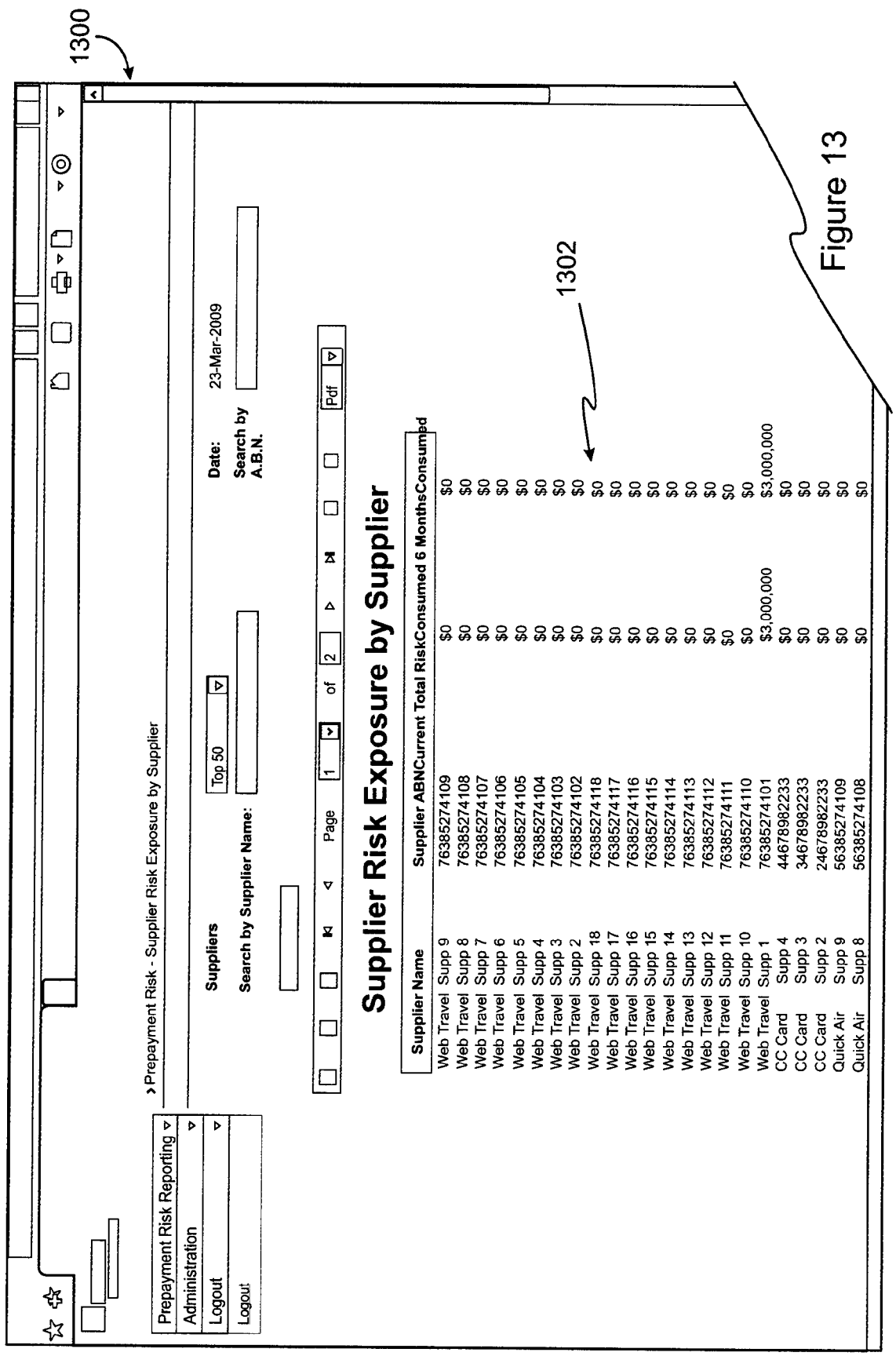
FIG. 13 illustrates a Supplier Risk Exposure by Supplier Report.

FIG. 13 is a screenshot 1300 that illustrates a related report, detailing the exposure of the bank to particular suppliers, across all customers. A table 1302 provides the consolidated total exposure of all customers (on the system) to their suppliers over time. It enables an understanding of the risk exposure across all customers for particular suppliers of all customers. This report aims to capture all risk exposure against mutually used suppliers of all companies present in the system.

Figure 14:
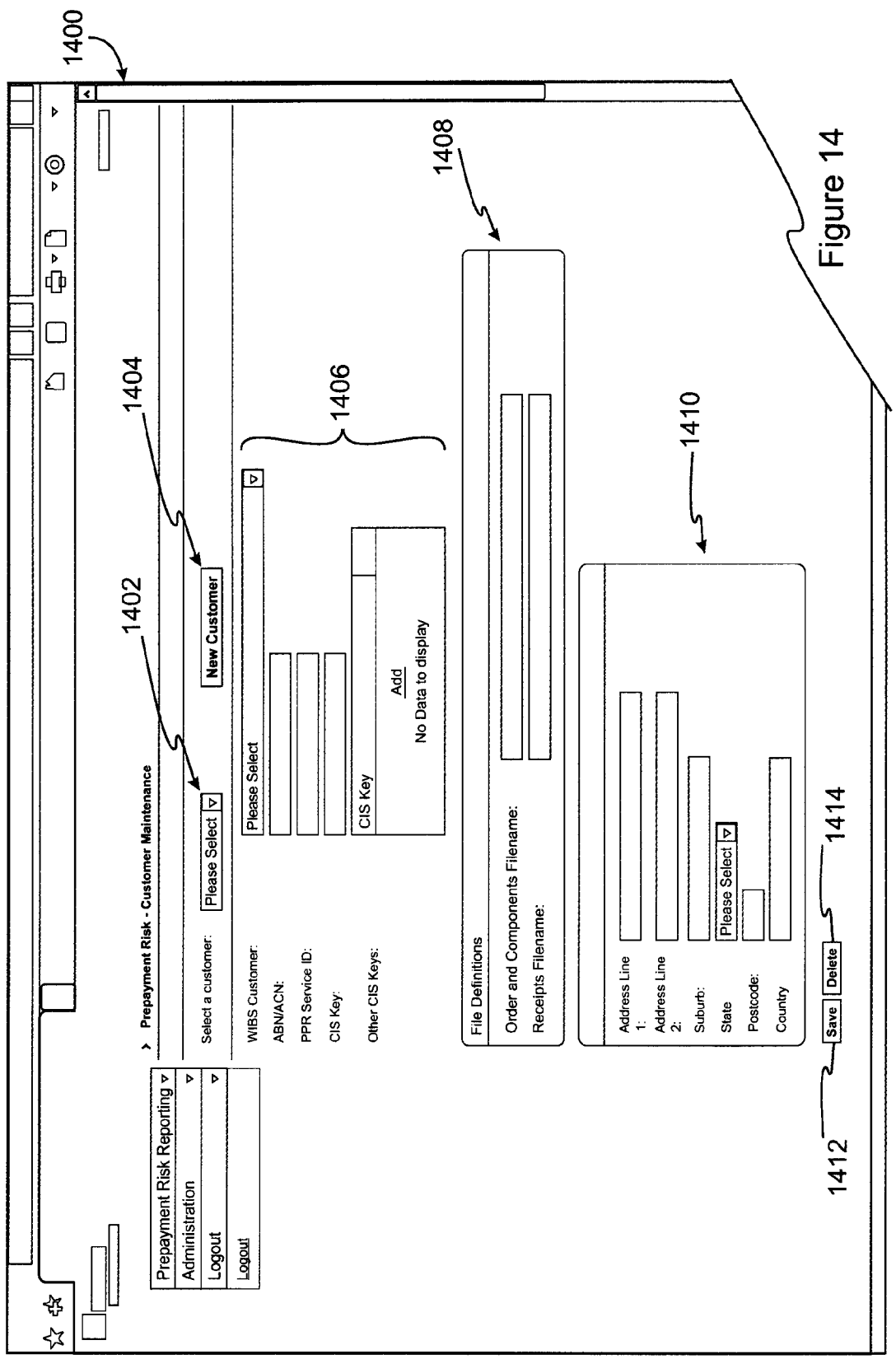
FIG. 14 illustrates a Customer Input File Errors Report.

It is important to provide an administration interface enabling each customer's details to be created on the system, and then appropriately maintained. A suitable customer maintenance screen 1400 is shown in FIG. 14. As noted above, with reference to FIG. 6, the customer maintenance screen 1400 is available to the PPRS product managers. This interface screen provides a drop down list 1402 for selection of a particular customer. Alternatively, a button 1404 is provided, enabling the user to create a new customer details record. Various customer details may be viewed and/or modified using the fields 1406. The user is also able to view and/or update customer file definitions, ie the order and components file name and the receipts file name, via the pane 408. Viewing and/or entry of the customer address is facilitated using the address pane 1410. Buttons 1412, 1414 are provided to save or delete a customer record respectively.

Figure 15:
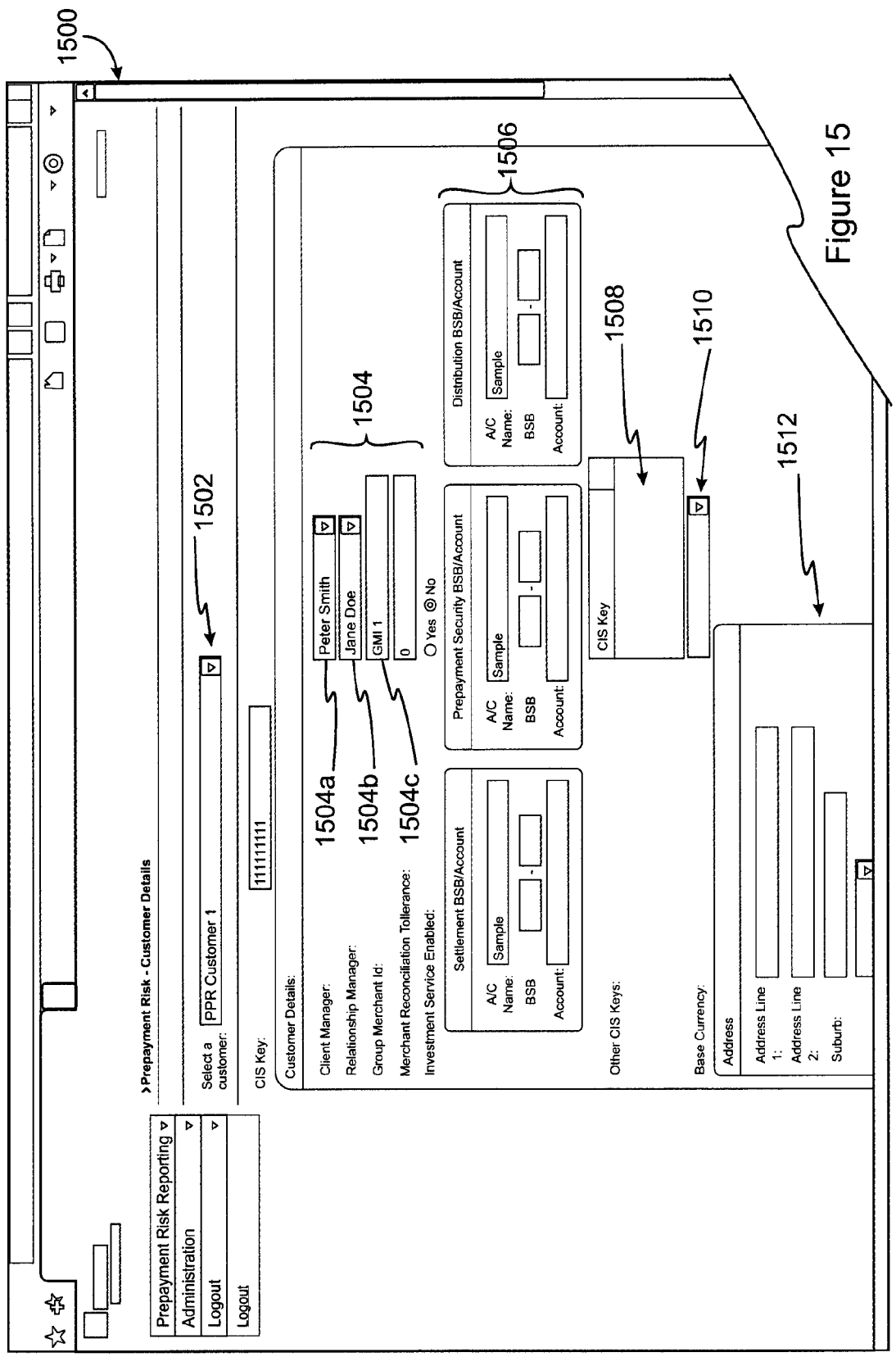
FIG. 15 shows an exemplary Customer Maintenance Administration display.

FIG. 15 illustrates a customer details screen 1500 that is accessible via the customer details item 610 of the product manager menu 600. A drop down list 1502 enables selection of a customer. Various customer details may be viewed and/or modified via the fields 1504. Entry panes 1506 are also provided to enable the specification of account details, for example of the settlement account, the prepayment security account, and the distribution account. A facility 1508 is also provided for viewing or modification of additional relevant unique bank reference numbers (ie UCR or CIS keys), as well as for defining the basic currency 1510 for the customer. A pane 1512 enables viewing and/or updates of the customer address.

Figure 16:
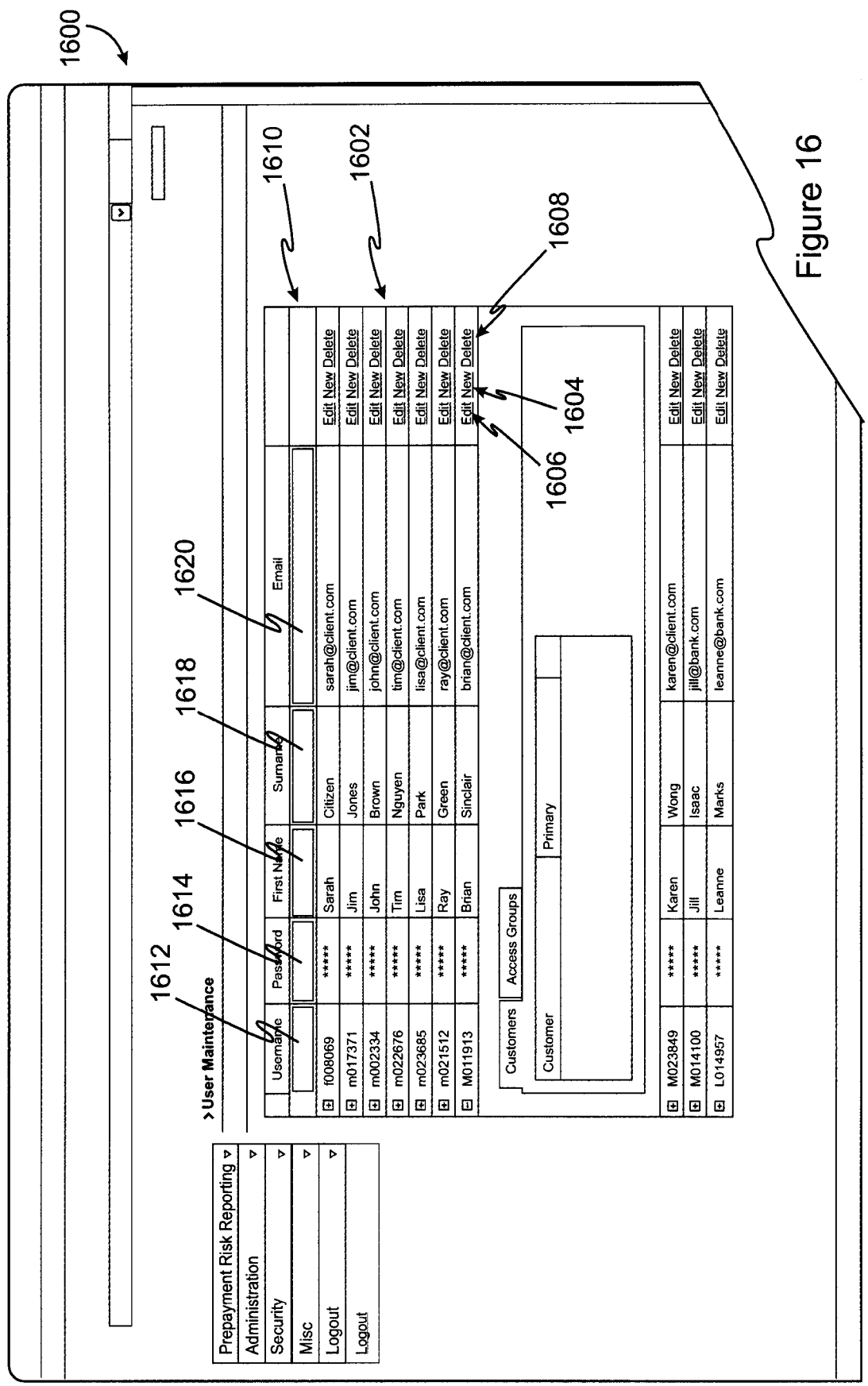
FIG. 16 shows an exemplary Customer Details Administration display.

Turning now to FIG. 16, there is shown a user maintenance screen 1600, accessible to the product manager via the menu item 612 of the menu 600. This screen comprises a list of customers 1602, along with selectable items 1604, 1606, 1608 for creating new entries, editing existing entries, or deleting existing entries, respectively. A group of fields 1610, including user name 1612, password 1614, first name 1616, surname 1618, and email 1620, are provided for entry and/or editing of customer details.

Tables 6 to 13 detail, for the preferred embodiment, the actions and system responses corresponding with user interaction with the above-described screens.

TABLE 6

Customer Selection Actions

| # | Action | System Response |
|---|---|---|
| 1 | A drop down list of Customers is presented at the top of the screen. | Default value in the drop down list is '<Select Customer>'. |
| 1a | Where a user clicks on the drop down list the system will display in the list all current customer names added to the system. The user may then select a customer value from the list. | The system will query all values to be displayed in the screen for the customer. |
| 2 | Button elements are available in the screen that allows a user to 'Modify' or 'Delete' customer details. | Refer to Tables 7 and 8 for actions that occur when a user selects either the Modify or Delete buttons. |

TABLE 7

Customer Detail Modification Actions

| # | Action | System Response |
|---|---|---|
| 1 | User Clicks on the drop down list 1502 selecting the customer value from the list to be modified. | Text fields are displayed with data populated from database query allowing data entry. Where no data has been previously entered for the customer, blank fields are presented. Data Entry cursor is placed at the drop down list for 'Client Manager' text box. Where a Client Manager has not been selected previously (as would be the case for a new customer) the default value displayed would be '<Select>'. |
| 2 | Only those users that are in the User Group WIB Relationship are selectable from the Client Manager 1504a and Relationship Manager 1504b Drop Down List. Therefore a Client Manager & Relationship Manager needs to become a user of the system and assigned to the WIB Relationship group prior to completion of this screen for a new customer. | Selected Client Manager is displayed. Selected RM is displayed. |
| 3 | User may edit text to all fields. | System moves to next data entry text field on either a TAB or Enter. |
| 4 | Clicking "Save" button will start data validation routine. | Validation routine is completed as per 'Add Customer' event. |
| 5 | txt_Cust_Group_Merchant_ID 1504c to be 15 Numeric Characters. Value is required. Can only be sourced from Client Manager records. | A Value entered not meeting the validation returns an error to screen of: "Please enter a valid Customer Group Merchant Service ID." |
| 6 | BSB and Account numbers entered in account entry fields 1506 should meet standard conventions, but may be for other banks as well. Settlement and Prepayment Security BSB/Account number are required. Distribution Account is required. Bank BSB and accounts are only accepted for Prepayment Security Accounts. | A value entered not meeting the validation returns an error to screen of "Please enter a valid Settlement[Prepayment Security][Other] BSB[Account Number]." |
| 7 | A single text field 1508 is provided for additional customer UCR keys that must be of 11 numeric characters in length. Where more than one UCR key needs to be entered a user may type the UCR Key and then press the Add button. This commits the UCR key to database after a validation of the single field and presents a blank field. An Edit button is also presented that opens an additional browser window for editing or | When a single UCR Key is added, the system validates that all required numeric's have been entered and then either: Places a message next to field to read "UCR Key added to customer" or an error message reading "Please enter a valid UCR Key". |

TABLE 7-continued

Customer Detail Modification Actions

| # | Action | System Response |
|---|--------|-----------------|
|   | deleting multiple UCR Keys. See Adding Multiple UCR Key event below. | |
| 8 | txt_Cust_Base_CCY 1510 should be a drop down list of 'AUD' and 'NZD'. | A value not meeting the validation returns an error to screen of "Please enter a valid Currency mnemonic." |
| 9 | Street, Suburb/City, State and Post Code entered in address field 1512 should have relevant validation rules for addresses. Values in these fields are mandatory. | A value not meeting the validation returns an error to the screen of "Please enter a street address [Suburb/City], [State], or [Post Code]." |
| 10 | Once validation routine is passed on all fields, data is committed to database replacing the customer record. | System can show that text fields become view mode only and a message can be displayed next to save button stating "Customer details have been saved." |

TABLE 8

Delete Customer Record Actions

| # | Action | System Response |
|---|--------|-----------------|
| 1 | User Clicks the 'Delete' Button 1414. | System displays a warning dialog box titled "Delete Customer Details" and message: "Are you sure you wish to delete Customer Details from the system?" with OK/Cancel buttons. Pressing cancel returns to screen, otherwise next step is completed. |
| 2 | Customer record is set to have 'Archive' Flag. | Record is updated with an Archive flag. |
| 3 | Customer User records are set to have 'Archive' Flag. | Records are updated with an Archive flag. |
| 4 | All other databases are searched for records that have customer records with them and set with Archive Flag. | Records are updated with an Archive flag. |
| 5 | Screen displays that customer record is deleted by displaying screen with no data in fields. | Next to save button a message stating 'Customer has been deleted' is displayed. |

TABLE 9

Add Multiple UCR Key Actions

| # | Action | System Response |
|---|--------|-----------------|
| 1 | When the Add Key 1508 is clicked, an event is triggered that displays a new browser window. | Browser window titled 'Additional UCR Keys' is displayed. |
| 2 | The system will query the database for all additional UCR Keys for the customer record. | One or many UCR Keys are returned and displayed in a matrix. |
| 3 | A user may click on Edit to alter a UCR Key listed. | User is presented with editable text for the UCR Key field. Edit Button changes to 'Save' button. |
| 4 | Clicking 'Save' button updates that UCR record. | Altered UCR Key is committed to database. |
| 5 | A user may click on Delete next to a UCR Key listed. | The UCR Key will be deleted from the table displayed and removed from the customer record. |

TABLE 10

Customer User Maintenance Actions

| # | Action | System Response |
|---|--------|-----------------|
| 1 | A list of users 1602 is displayed on the screen allowing the administering user to select a user to edit or delete | |
| 2 | A user may click the 'New', 'Edit' or 'Delete' buttons 1604, 1606, 1608 to initiate the corresponding actions. These actions are set out in Tables 11, 12 and 13. | |

TABLE 11

Add User Actions

| # | Action | System Response |
|---|--------|-----------------|
| 1 | User Clicks the 'New' button 1604. | Text fields 1610 are displayed as blank allowing data entry. Data Entry cursor is placed in 'User ID' text box 1612. |
| 2 | User may add text to all fields. | System moves to next data entry text field on either a TAB or Enter. |

TABLE 11-continued

Add User Actions

| # | Action | System Response |
|---|--------|-----------------|
| 3 | Customer list is expanded by selecting expand icon, user selects 'New' | TAB into value where pressing arrow down will open the selection list and arrow up and down will change value selected. Pressing Enter or TAB will accept the value and move to next field. |
| 4 | Click 'Update' button. | Data is saved. |
| 5. | Pressing Enter on Save button or clicking button will start validation data validation routine. | Validation routine is completed in tasks below. |
| 9 | txt_User_ID 1612 is checked to be Alpha Numeric Characters and more than 3 characters. Value is required. | A Value entered not meeting the validation returns an error to screen of: "Please Enter User ID of at least 3 characters in length." |
| 10 | txt_User_Password 1614 is checked to be 6 characters in length. Value is required. | A value entered not meeting the validation returns an error to screen of "Please enter a valid temporary password". |
| 11 | txt_User_Name 1616, 1618 is checked to be more than 3 characters in length. Value is required. | A value entered not meeting the validation returns an error to screen of "Please enter a valid name for the user". |
| 12 | txt_User_Email_Address 1620 is checked for at least 8 characters in length containing either Alpha or Numeric Characters only plus a '@' and full stop. Value is required. | A value entered not meeting the validation returns an error to screen of "Please enter a valid email address." |
| 13 | txt_User_Address is checked for at least 3 characters in length. Value is required. | A value not meeting the validation rule returns an error to screen of "Please enter a valid address". |
| 14 | Where a validation routine is not passed the user must enter information once again and click 'update' button | Validation routine is completed again on all data fields. |
| 15 | Once validation routine is passed on all fields, data is committed to database as a new Customer User record. | System can show that text fields become view mode only and a message can be displayed next to save button stating "New Customer User has been added." |

TABLE 12

Modify User Actions

| # | Action | System Response |
|---|--------|-----------------|
| 1 | User Clicks the 'Edit' Button 1606. | Text fields 1610 are displayed with data populated from database query allowing data entry. Data Entry cursor is placed in 'User ID:' text box 1612. |
| 2 | User may edit text to all fields. | System moves to next data entry text field on either a TAB or Enter. |
| 3 | Drop down list values remain as they did in database unless changed. | |
| 4 | Clicking on the 'Update' button will start validation data validation routine. | Validation routine is completed as per 'Add Customer User' event. |
| 5 | Once validation routine is passed on all fields, data is committed to database replacing the customer record. | System can show that text fields become view mode only and a message can be displayed next to save button stating "Customer User record has been saved." |

TABLE 13

Delete User Actions

| # | Action | System Response |
|---|--------|-----------------|
| 1 | User Clicks the 'Delete' Button 1608. | System displays a warning dialog box titled "Delete Customer User' and message: "Are you sure you wish to delete this Customer User from the system?" with OK/Cancel buttons. Pressing cancel returns to screen, otherwise next step is completed. |
| 2 | User record is set to have 'Archive' Flag. | Record is updated with an Archive flag. |
| 3 | Screen displays that user record is deleted by displaying screen with no data in fields. | Next to save button a message stating 'User has been deleted' is displayed. |

As previously described with reference to FIG. 1(b), data is required to be transferred to and from the PPRS system 152 to the main bank credit system 158 in order to implement the preferred embodiment of the present disclosure. Table 14 summarises the data transfer required between systems.

TABLE 14

Data Transfer Between PPRS and Credit Systems

| Source System | Target System | Transaction Description | Transaction Content (major attributes) |
|---------------|---------------|------------------------|----------------------------------------|
| Bank credit system | PPRS | Credit Limit and Security details. | Fixed Facility Limit, Total Credit Limit, Fixed Security Value, Fixed Security Floor percentage. |
| PPRS | Bank credit system | Floating Security details calculated, total security held, total amount prepaid sales. | Facility ID & Status, Fluctuating Security value and percentage, total amount security, prepaid sales total. |
| 'DA'-POS Reporting Data | PPRS | Merchant Terminal Transactions | Merchant Transactions |
| PPRS | Automatic Clearing House (ACH) | Security Release Funds and Security Required Amount transactions | Debit and/or Credit to Trading Bank Accounts. |

The data from the bank's credit system 158 to be transferred to the PPRS system 152 preferably conforms to the file specification set out in Table 15.

TABLE 15

PPRS/Credit System Data Transfer File Specification

| Field Name | Field Description | Destination Table/Field | Action |
|------------|-------------------|-------------------------|--------|
| UCR_Key | Customer UCR Key | Customers.Cust_UCR_Key | Identify record to update. |
| Cust_Name | Customer Name | Customers.Cust_Name | Update |
| Cust_ABN_ACN | ABN or ACN of the Customer - only 1 field exists in CMS - may contain either or blank. Field is optional in CMS. | Customers.Cust_ABN_ACN | Update |
| Cust_RM_bsb | Relationship Manager cost centre | Customers.Cust_RM_bsb | Update |
| Cust_RM_portfolio | Relationship Manager Portfolio | Customers.Cust_RM_portfolio | Update |
| Cust_RM_number | Relationship Manager Number | Customers.Cust_RM_number | Update |
| Cust_RM_name | Relationship Manager Name | Customers.Cust_RM_name | Update |
| Cust_TAL_currency | Currency for Total Approved Limit - Default value is AUD. | Customers.Cust_TAL_currency | Update |
| Cust_TAL_aud | Approved AUD limit of MAA facility available to the customer | Customers.Cust_TAL_aud | Update |
| Cust_TAE_aud | Customer's total approved exposure (gross) before mitigation. | Customers.Cust_TAE_aud | Update |
| Cust_NET_TAE_aud | Customer's total approved exposure (net) after mitigation. | Customers.Cust_NET_TAE_aud | Update |
| PPR_Fixed_Sec_$ | Non Fluctuating $ amount representing the value of non-cash security held for prepayment risk. | Security.PPR_Fixed_Sec_$ | Update |

TABLE 15-continued

PPRS/Credit System Data Transfer File Specification

| Field Name | Field Description | Destination Table/Field | Action |
|---|---|---|---|
| PPR_Non_Fluctuating_Sec_Floor_% | Non Fluctuating % of prepaid sales that must be kept as security for prepayment risk. | Security.PPR_Non_Fluctuating_Sec_Floor_% | Update |
| Facility_Key | CMS identifier for a facility | Customers.Facility_Key | |

The data from the PPRS 152 to the bank's credit system 158, typically sent on a daily basis, preferably conforms to the file specification set out in Table 16.

TABLE 16

Credit/PPRS System Data Transfer File Specification

| Field Name | Field Description | Source Table/Field |
|---|---|---|
| UCR_Key | Customer UCR Key | Security.Cust_UCR_Key |
| PPR_Fluctuating_Cash_Sec_$ | The calculated $ value of fluctuating cash security held for prepayment. | Security.PPR_Fluctuating_Cash_Sec_$ |
| Prepaid_Sales | The $ amount of prepaid sales of the customer - will be used to populate 'Outstandings' field in CMS. | Sales.Prepaid_Sales |
| Facility_Key | Facility Identifier from CMS. | Customers.Facility_Key |
| Closed_Status_Flag | Status of the facility - ie whether it is open or closed. | Customers.Closed_Status_Flag |
| Total_Merchant_Sales | Total Merchant Sales for the year based on a rolling 365 day total. | Sales.Total_Merchant_Sales |

The Point of Sale system 165 transmits to MFT the transaction and settlement data for each day merchant id and terminal id. This data includes POS information for the relevant services.

An email alert 192 resulting from the comparison of POS Terminal totals and the PPRS Sales data from the customer being different to that outside of the nominated tolerance will preferably include the following information:
- Prepayment Risk Customer Sales Total;
- Immediate Sales Value Sub Total;
- Prepayment Sales Value Sub Total;
- POS Settlement Total;
- Merchant Reconciliation Tolerance Percentage; and
- Actual Difference Percentage between PPR Sales Total and Merchant Settlement Total.

Overnight, it is envisaged that the system 150 will perform a number of scheduled tasks, at a time when customer and Bank users are not using reporting functionality within the system. These scheduled tasks that occur overnight may include:
- Importing of Customer Data 153;
- Importing of POS data 167 (noted as 6:00 am) to perform reconciliation to customer records;
- Execution of calculations, in order to ease load on the queries needing to be performed by calculating values and placing them as totals in additional tables;
- Reconcile total Order and Components Sales Totals to the POS Total Settlement Value for previous day, and alert 192 Product Manager where the total difference is above Merchant Reconciliation Tolerance Percentage;
- Reconcile Balance of the Trading Bank prepayment security accounts to the Total_PPR_Sec field for each PPRS customer;
- Email 194 to the PPRS Product Manager, and other email addresses if required, of any Calculated PPRS Exposure Breach;
- Email 190 to the PPRS Product Manager, and other email addresses if required, of any Unreconciled Prepayment Security Trading Account to that of the Total PPR Security amount field;
- Moving of 'archive' flagged data to the Archive data store and removing 'delete' flagged data;
- Clean up of components that have passed their consumption date;
- Email 196 on a weekly basis to PPRS Product Manager, and other email addresses if required, any Credit Changes that are waiting for approval for over a week;
- Sweeping (transfer) of a positive Daily PPSA Sweep Amount into the Security Investment Account (from the Customer's Merchant Settlement Account); and
- Sweeping (transfer) of a negative Daily PPSA Sweep Amount out of the Security Investment Account into the customer's distribution account.

Investment Service calculations are performed as follows:
- At the close of each business day, once the customer sales data has been received, PPRS will calculate PPR_Fluctuating_Cash_Sec_$;

PPRS will then calculate the Daily_PPSA_Sweep_Amount;

PPRS will then calculate the total amount of prepaid sales consumed on that day based on the Risk_Release_Date (PPSA_Debit_Amount);

PPRS will then create an EFT file to debit the amount calculated in from the Trading Bank prepayment security account and credit it to the Customer's distribution account;

PPRS will then calculate the amount that needs to be debited from the customer's settlement account as follows: PPSA_Credit_Amount=Daily_PPSA_Sweep_Amount+PPSA_Debit_Amount; and PPRS will create an EFT file that will debit the customers settlement account with PPSA_Credit_Amount.

The credit function is to determine the following variables:

The value (%) of the offsetting security held: this will be determined in conjunction with the customer, based on the risk grading of that customer. If the security is cash, Credit will need to determine what percentage of cash must be held (1-100%). If the security is not cash, it will need to be recorded in the credit system as a fixed value.

The % at which alerts should be set: eg when the solution should alert WBC with regards to how close the Customer's total prepayment risk is to its approved credit limit.

Figure 17:
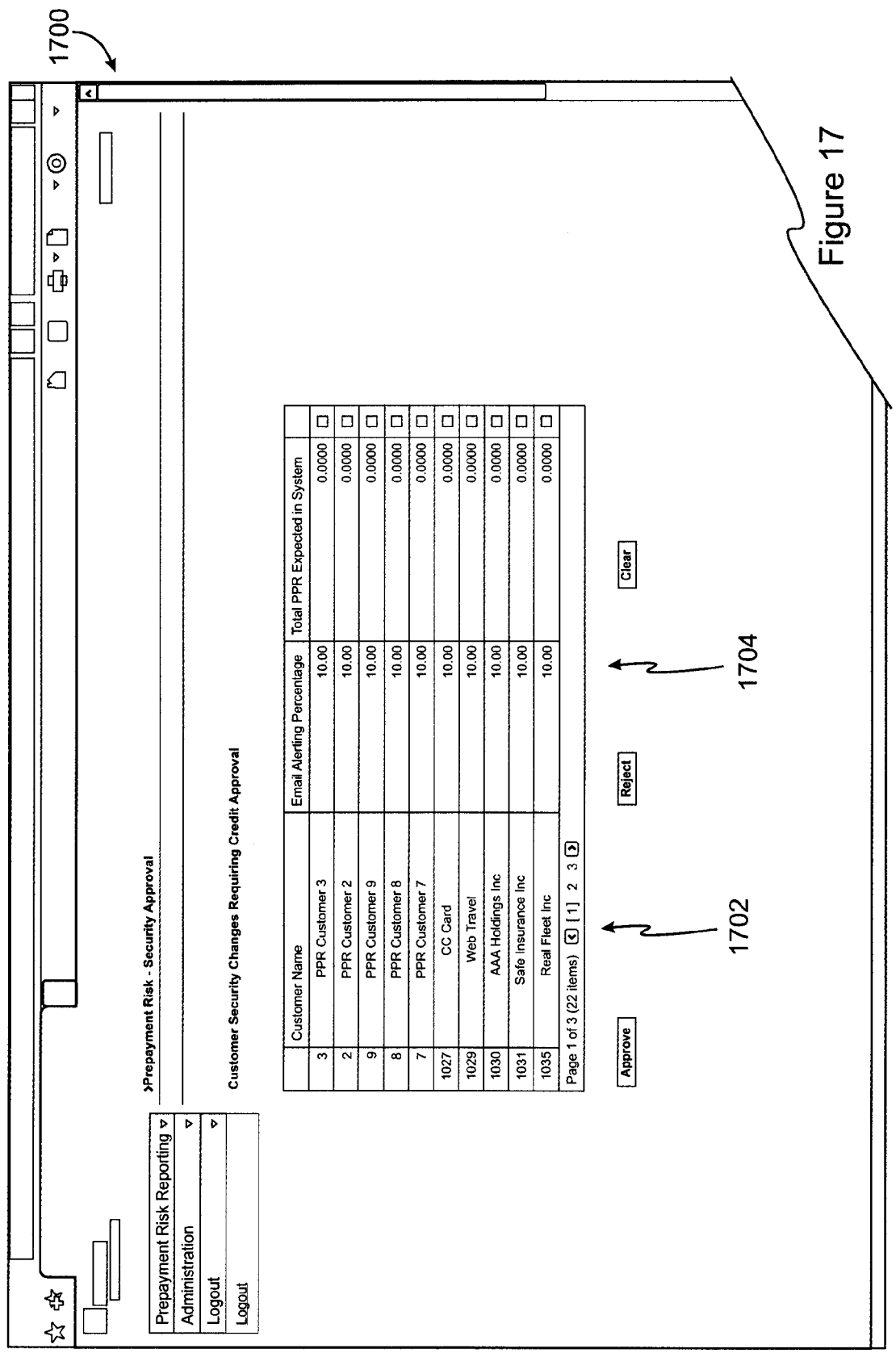
FIG. 17 shows an exemplary Security Approval display.

By way of illustration FIG. 17 shows a screenshot 1700 of a report indicating, for various customers 1702, the percentage 1704 for alerts to be sent.

According to a preferred implementation, the security amount is determined simply from the prepayment exposure amount from time to time. The security percentage, as discussed above, is multiplied by the prepayment amount to give the amount required. This may be partly or wholly in securities other than a cash amount. Of course, this is only one example of such a process, a bank may decide to implement a different algorithm or process to determine the security amount required, within the scope of the present disclosure.

Figure 18:
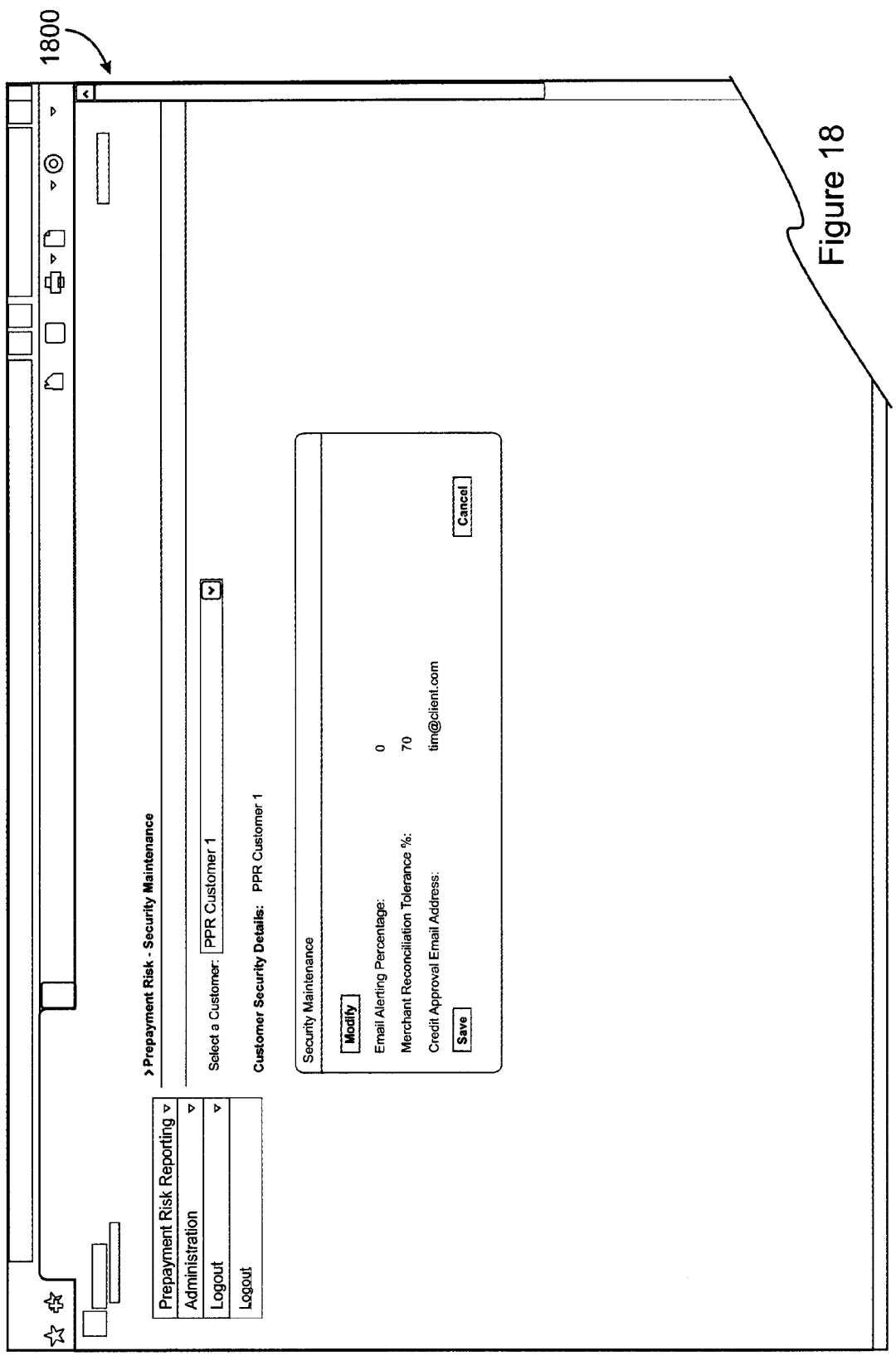
FIG. 18 shows an exemplary Security Maintenance display.

FIG. 18 shows a screenshot 1800 of an exemplary display whereby the security percentage is maintained, and changed if required.

Figure 19:
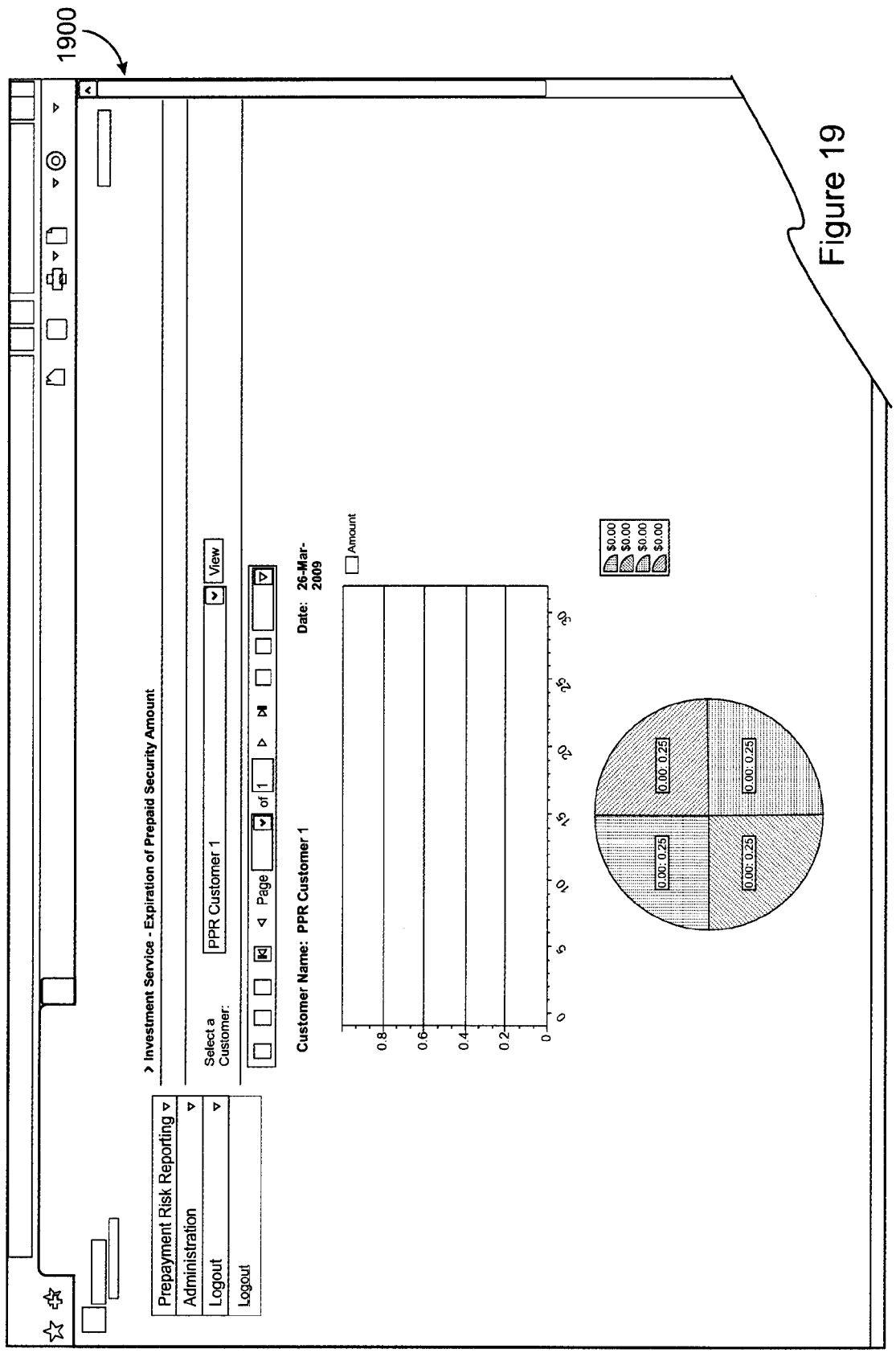
FIG. 19 shows an exemplary report illustrating expiry of prepaid amounts.

FIG. 19 is a screenshot 1900 illustrating the format of a report showing the expiration dates for various parts of the prepayment exposure. This is very useful for the customer, as it provides them with a tool to manage the expected releases of funds over coming periods.

FIG. 20 illustrates the format of an internal bank report 2000 providing reconciliation between the actual funds held in the security investment account, and the amount as recorded in the PPRS. It ensures the bank is holding the correct amount of security. It will be appreciated that while this is a bank account visible through all standard channels, internet, etc, it is not one to which the customer has any routine access.

The following is a simplified, notional example intended to illustrate the practical operation of one possible implementation of the inventive system.

An airline (the merchant for this example) receives the following booking on 18 Aug. 2009, paid in full using a Credit Card:

1-Flight ($500), departing 20 Sep. 2009.

The credit card scheme, for example MasterCard or Visa, will credit the merchant's settlement account, generally overnight. The airline's ERP system will forward a file to the PPRS system to advise of this booking. As a consequence, the airline's prepayment exposure to the bank will increase by $500, this will be reflected in the PPRS records, and passed on to the credit system as an increase in exposure.

This amount will be included in the outstanding prepayment exposure total, within the PPRS system, until the corresponding services (flight) have been delivered. In this case, when the flight is taken on 20 Sep. 2009, the $500 will be removed from the total and the order archived.

From the perspective of the investment component, when PPRS receives the Receipts file from the merchant, it will determine that (assuming the bank is retaining 100% of exposure as security and there is insufficient fixed security) $500 needs to be deducted from the Merchant Settlement Account and credited to the merchant's Security Investment Account until 20 Sep. 2009 as additional fluctuating cash security. Assuming the order is not changed on 20 Sep. 2009 PPRS will include in the daily ACH file an instruction to sweep $500 from the Security Investment Account to the Customer's Distribution Account, as the risk no longer exists and security no longer needs to be held for this order.

It will be understood that in practice there are thousands of these transactions happening daily. The net effect of all changes to the prepayment risk it totaled together, and it is this amount that is used to adjust security exposures and credit systems. It will be appreciated that the details of screens, processes, risk management and so forth represent only one implementation in one bank environment of the present disclosure. It will be understood that the details of implementation would be expected to vary between institutions, and reflect the internal systems and processes within each institution.

The invention claimed is:

1. An automated method executed by a computer system to manage credit card prepayment exposure with respect to one or more merchants, comprising for each merchant at least the steps of:

receiving, at the computer system, data from the merchant itemising:
 (a) current prepayment sales and corresponding anticipated fulfilment timing;
 (b) credit payments corresponding to each prepayment sale; and
 (c) current fulfilment of prepayment orders, storing the received data in a memory associated with the computer system;

a computer system processor matching previously stored prepayment sales to current fulfilment of prepayment orders identified in said received data to determine a quantum of outstanding prepayment orders having an associated time profile based upon stored fulfilment timing data;

the computer system processor applying a predetermined risk weighting to the quantum and time profile, in accordance with a predetermined instruction set, and thereby determining an appropriate security amount; and the computer system processor automatically applying predetermined business rules to either retain or release security funds, responsive to the determined security amount, so that a change in the quantum of outstanding prepayment orders corresponds to a dynamic variation in the security funds.

2. The method of claim 1, further comprising the step of communicating or displaying a report indicative of one or more of the quantum of the outstanding prepayment orders, the security amount, and the variation in the security funds.

3. The method of claim 2, wherein communicating or displaying a report comprises the computer system processor enabling the merchant to remotely access the computer system, so as to view reports.

4. The method of claim 1, wherein the computer system processor retaining or releasing security funds, responsive to the determined security amount, further results in an increase or decrease of the balance of funds in an account that the merchant can view, but to which the merchant does not have transactional access.

5. The method of claim 1, wherein the predetermined risk weighting applied by the computer system processor is selected according to different prepayment sales or different components of said sales.

6. The method of claim 5, wherein the predetermined risk weighting applied by the computer system processor is selected responsive to the identity of a supplier of a particular sale or component of a sale.

7. A system for managing credit card prepayment exposure with respect to one or more merchants, said system comprising a communications interface, one or more servers comprising at least one computer system processor, a database and associated memory, and application software comprising instruction executable by said one or more servers, wherein execution of the application software instructions causes the system to implement a method comprising the steps of:
   receiving from said merchants via said communications interface, data itemising:
      (a) current prepayment sales and corresponding anticipated fulfilment timing;
      (b) credit payments corresponding to each prepayment sale; and
      (c) current fulfilment of prepayment orders,
   and storing the received data in said database;
   the computer system processor matching previously stored prepayment sales to current fulfilment of prepayment orders identified in the received data, thereby determining a quantum of outstanding prepayment orders having an associated time profile based upon stored fulfilment timing data;
   the computer system processor applying a predetermined risk weighting to the quantum and time profile, in accordance with a predetermined instruction set, and thereby determining an appropriate security amount; and
   the computer system processor automatically applying predetermined business rules to either retain or release security funds, responsive to the determined security amount, so that responsive to a change in the quantum of outstanding prepayment orders, the value of required security funds is dynamically varied.

8. The system of claim 7, wherein execution of the application software instructions further causes the computer system processor to communicate or display a report indicative of one or more of the quantum of the outstanding prepayment orders, the security amount, and the variation in the security funds.

9. The system of claim 8, wherein execution of the application software instructions causes the computer system processor to implement a remote access interface via the communications interface, through which the merchants are able to request and view reports.

10. The system of claim 7, wherein execution of the application software instructions causing the computer system processor to retain or release security funds results in a respective increase or decrease of the balance of funds in an account viewable by the merchant.

11. The system of claim 7, wherein the predetermined risk weighting applied by the computer system processor is selected for different prepayment sales or different components of said sales.

12. The system of claim 11, wherein the predetermined risk weighting applied by the computer system processor is selected responsive to the identity of a supplier of a particular sale or component of a sale.

13. A non-transitory computer-readable medium comprising computer-executable instructions which, when executed by a computer system cause the computer system to execute a method for managing credit card prepayment exposure with respect to one or more merchants, comprising for each merchant at least the steps of:
   receiving data from the merchant itemising:
      (a) current prepayment sales and corresponding anticipated fulfilment timing;
      (b) credit payments corresponding to each prepayment sale; and
      (c) current fulfilment of prepayment orders,
   storing the received data in a memory of the computer system;
   matching previously stored prepayment sales to current fulfilment of prepayment orders identified in said received data to determine a quantum of outstanding prepayment orders having an associated time profile based upon stored fulfilment timing data;
   applying a predetermined risk weighting to the quantum and time profile, in accordance with a predetermined instruction set, and thereby determining an appropriate security amount; and
   automatically applying predetermined business rules to either retain or release security funds, responsive to the determined security amount, so that a change in the quantum of outstanding prepayment orders corresponds to a dynamic variation in the security funds.

\* \* \* \* \*